US008446479B2

(12) United States Patent
Uemura et al.

(10) Patent No.: US 8,446,479 B2
(45) Date of Patent: May 21, 2013

(54) PHOTOGRAPHING APPARATUS

(75) Inventors: Yuiko Uemura, Hachioji (JP); Masashi Takahashi, Hachioji (JP); Satoshi Hara, Hino (JP); Akira Tani, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 267 days.

(21) Appl. No.: 12/850,231

(22) Filed: Aug. 4, 2010

(65) Prior Publication Data
US 2011/0032372 A1 Feb. 10, 2011

(30) Foreign Application Priority Data

Aug. 7, 2009 (JP) ................................. 2009-184558

(51) Int. Cl.
*H04N 5/225* (2006.01)
(52) U.S. Cl.
USPC .............. 348/220.1; 348/333.11; 348/333.12; 348/239
(58) Field of Classification Search
USPC ................. 348/220.1, 207.99, 208.99, 221.1, 348/333.01, 333.11, 333.12, 231.99, 239
See application file for complete search history.

(56) References Cited

U.S. PATENT DOCUMENTS

| 6,906,746 B2* | 6/2005 | Hijishiri et al. ............ 348/240.2 |
| 2003/0043276 A1 | 3/2003 | Tojo |
| 2005/0128221 A1 | 6/2005 | Aratani et al. |
| 2006/0171703 A1 | 8/2006 | Abe et al. |

FOREIGN PATENT DOCUMENTS

| JP | 04-335183 | 11/1992 |
| JP | 07-67027 | 3/1995 |
| JP | 2001-078137 | 3/2001 |

OTHER PUBLICATIONS

Office Action for Chinese Patent Application No. 201010250268.2, mailed Jul. 4, 2012 (4 pgs.).

* cited by examiner

*Primary Examiner* — Roberto Velez
*Assistant Examiner* — Yih-Sien Kao
(74) *Attorney, Agent, or Firm* — John C. Pokotylo; Straub & Pokotylo

(57) ABSTRACT

A photographing apparatus according to the present invention comprises: an imaging section converting an object image into image data; a photographing section obtaining the image data from the imaging section in response to release operation and also obtaining the image data of continuous shooting from the imaging section before or after the release operation; a trimming section generating trimming images sequentially for frames in different areas, respectively, using the image data of the continuous shooting; and a control section recording the trimming image generated in the trimming section and the image data obtained in the release operation.

20 Claims, 14 Drawing Sheets

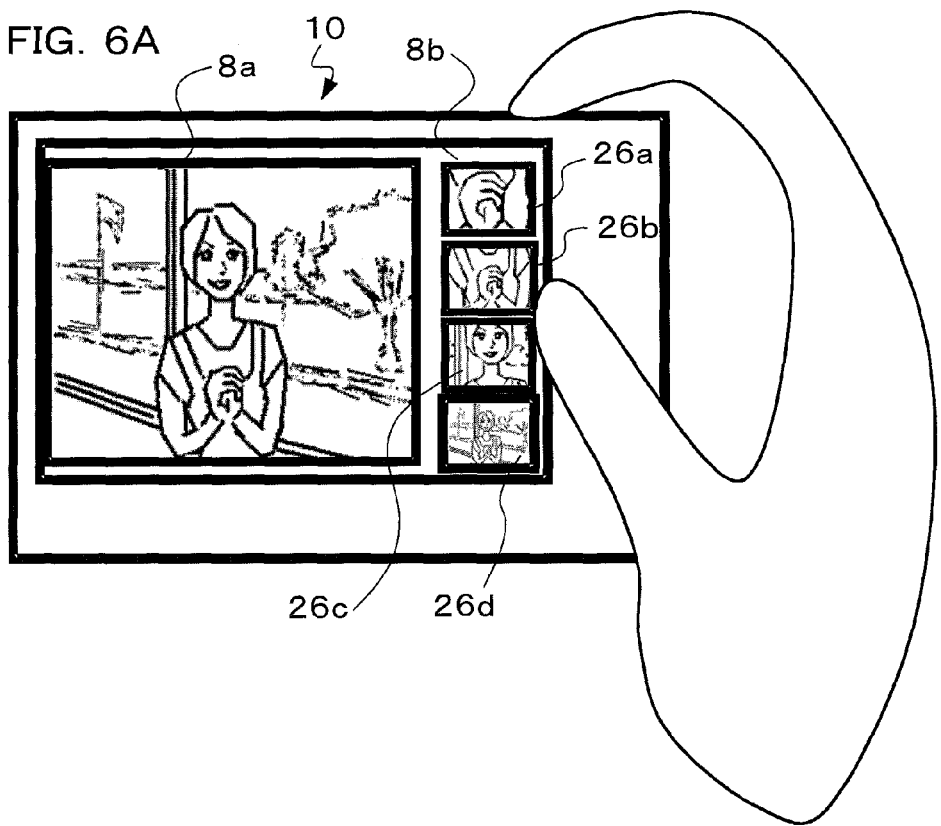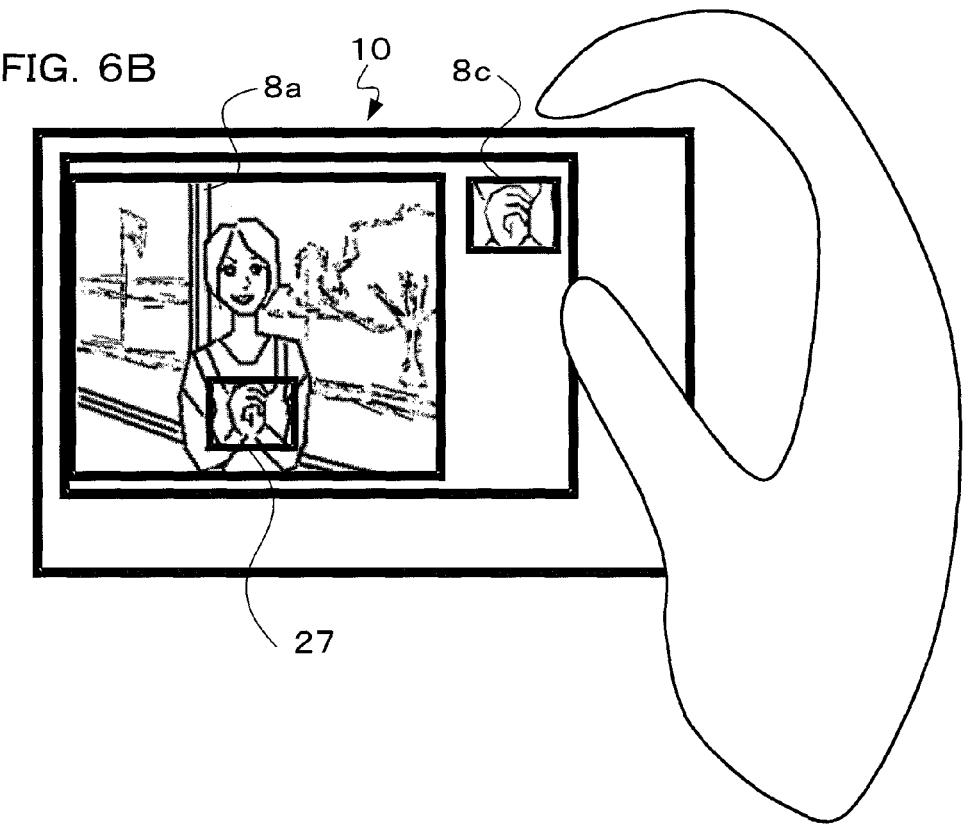

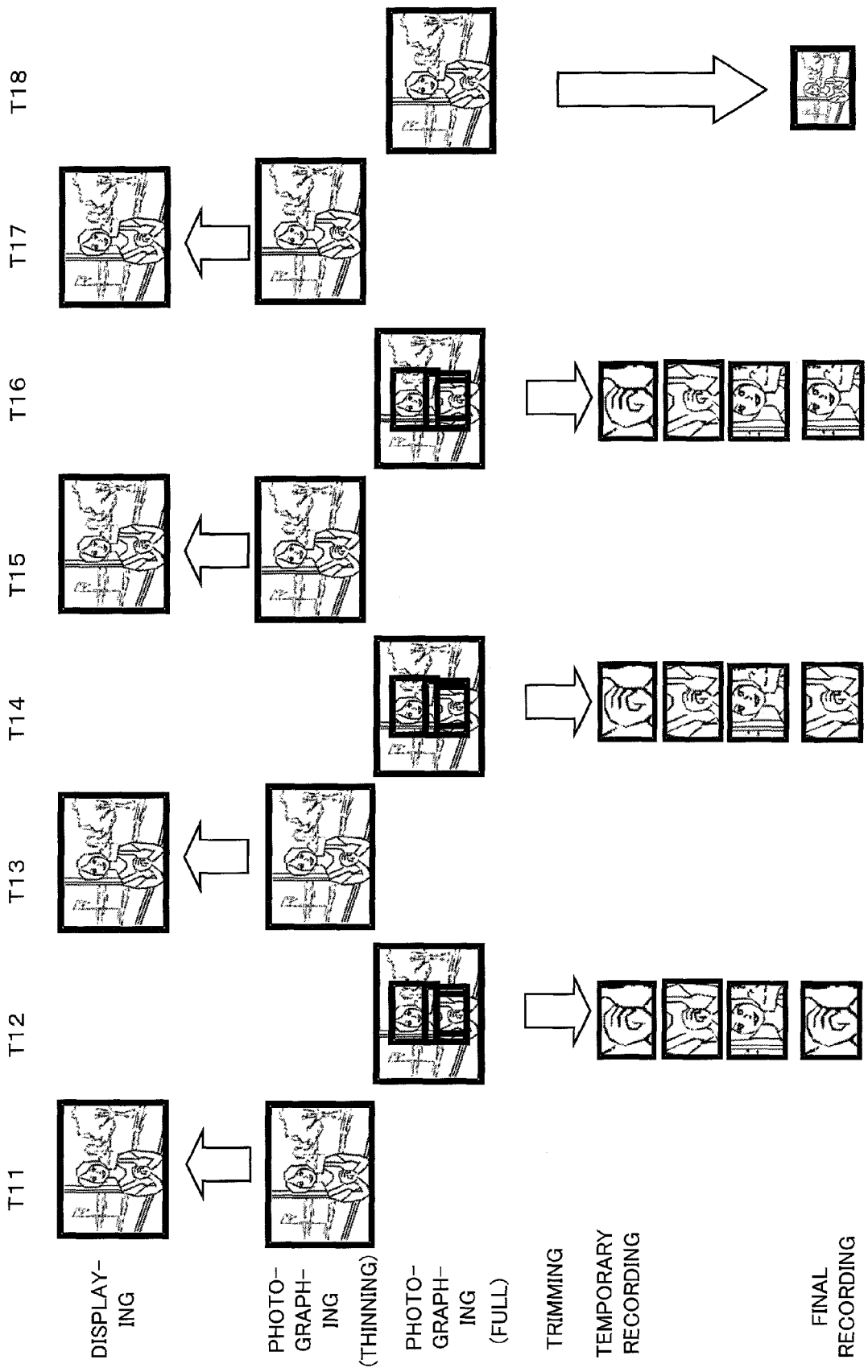

PHOTOGRAPHING APPARATUS

Benefit is claimed, under 35 U.S.C. §119, to the filing date of prior Japanese Patent Application No. 2009-184558 filed on Aug. 7, 2009. This application is expressly incorporated herein by reference. The scope of the present invention is not limited to any requirements of the specific embodiments described in the application.

BACKGROUND OF THE INVENTION

1. Field of the Invention

The present invention relates to photographing apparatuses, and, in more detail, relates to a photographing apparatus having a function of still image shooting and moving image shooting, such as a digital camera, a video camera, and a mobile phone with a camera.

2. Description of the Related Art

Still image shooting as cutting out a moment as in the conventional film photograph is comparatively simple for a user. On the other hand, in moving image shooting, it is difficult how to fix start timing and end timing and a movie camera has been used only in a formalized event such as an athletic festival and a wedding ceremony. Further, except when detailed rendering is preliminarily determined, a shot moving image has little variety and it is very difficult to make it an image worth viewing. This is because it is difficult to endure the monotonous image for a user accustomed to viewing a moving image in which composition changes frequently as in a TV program. Further, although a colorful expression can be obtained by the change of shooting parameters, it is difficult for an amateur user to do it.

Accordingly, there is an idea such as combining the still image and the moving image to provide variety to the image. For example, Japanese Patent Application Laid-Open Publication No. H4-331583 (Published on Nov. 19, 1992) or Japanese Patent Publication No. 3673528 (published on Mar. 10, 1995) discloses a camera capable of shooting a still image during shooting a moving image. Further, there is proposed a camera which edits a moving image after shooting to prevent the image from becoming monotonous.

In addition, Japanese Patent Application Laid-Open Publication 2001-078137 (published on Mar. 23, 2001), for example, discloses a camera capable of recording a moving image before and after still image shooting. Further, Japanese Patent Application Laid-Open Publication No. 2003-110995 (published on Apr. 11, 2003), for example, discloses a camera which provides a transition effect in the edition of a moving image when a connection rule (to end in a pan and to start in a pan) is not followed in the connection of a moving image, and allows even a user without technical knowledge for the moving image edition to perform the moving image edition easily.

SUMMARY OF THE INVENTION

The present invention aims at providing a photographing apparatus, in which anybody can easily photograph or display a colorful image having variety.

A photographing apparatus according to the present invention comprises: an imaging section converting an object image into image data; a photographing section obtaining the image data from the imaging section in response to release operation and also obtaining the image data of continuous shooting from the imaging section before or after the release operation; a trimming section generating trimming images sequentially for frames in different areas, respectively, using the image data of the continuous shooting; and a control section recording the trimming image generated in the trimming section and the image data obtained in the release operation.

BRIEF DESCRIPTION OF THE DRAWINGS

FIGS. 6A and 6B are diagrams showing still image shooting and a display state of a moving image shot in advance of this still image shooting, in a camera according to a first embodiment of the present invention.

FIG. 7 is a diagram showing a relationship among still image shooting, a display in moving image shooting which is performed in advance of this still image shooting, and an image to be recorded, in a camera according to a variation of a first embodiment in the present invention.

DESCRIPTION OF THE PREFERRED EMBODIMENTS

Figure 1:
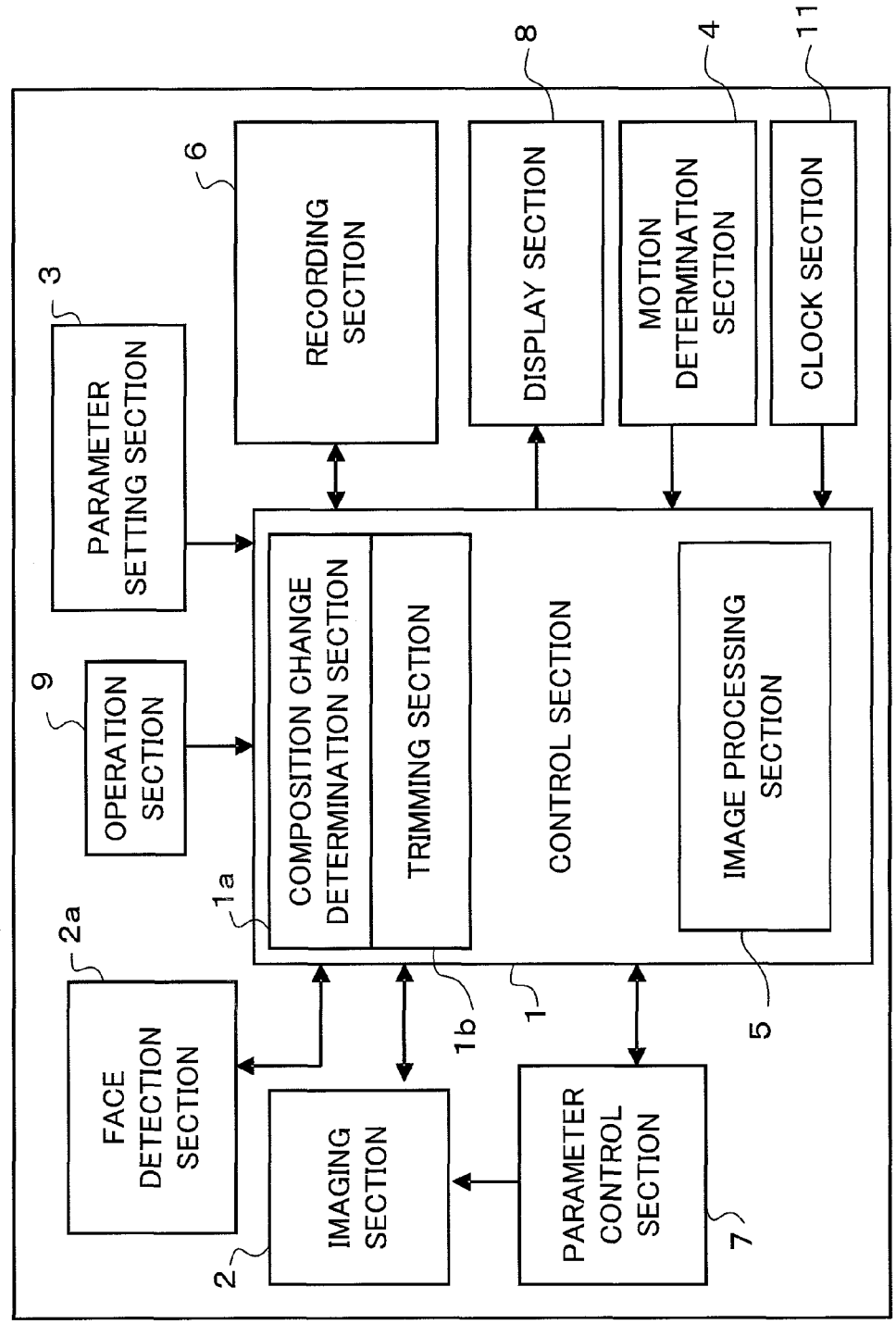
FIG. 1 is a block diagram showing an electrical configuration of a camera according to a first embodiment of the present invention.

Hereinafter, preferred embodiments will be described by the use of a camera to which the present invention is applied, according to the drawings. FIG. 1 is a block diagram showing an electrical circuit of a camera 10 according to a first embodiment of the present invention. The camera 10 is a digital camera and configured with a control section 1, an imaging section 2, a face detection section 2a, a parameter setting section 3, a motion determination section 4, a recording section 6, a parameter control section 7, a display section 8, an operation section 9, a clock section 11, and the like.

The imaging section 2 includes a photographing lens (zoom lens) having a zoom function and a focusing function, an exposure control section such as a shutter and an aperture, an image sensor, a driving and reading-out circuit of the image sensor, and the like, and converts an object image formed by the photographing lens into image data with the image sensor and outputs this image data.

A face detection section 2a detects whether or not a human face is included in the object image and detects the number of human faces and the position, size, and the like thereof when the face is included there according to the image data processed by the control section 1, and then outputs the detection result to the control section 1. Further, the face detection section 2a also detects face expression such as a smile degree. Note that the face detection is performed by the extraction of a shade and shadow in a face part such as an eye, a nose, and a mouth using a pattern matching method or the like.

The control section 1 controls a sequence of the entire camera 10 according to a program stored in a storage section within the control section 1. The control section 1 has a function as a photographing section, of obtaining the image data from the imaging section 2 in response to release operation and also obtaining the image data of continuous shooting from the imaging section 2 before or after the release operation to record the image data temporarily in a temporary recording section 5a to be described hereinafter.

The control section 1 has a composition change determination section 1a, a trimming section 1b, and an image processing section 5. The composition change determination section 1a determines whether or not the composition of a screen or the posture of the camera 10 is changed. In the determination of the composition change in the screen, the control unit 1 utilizes a motion vector or the like based on the image data output from the imaging section 2. Further, the posture of the camera 10 is determined based on a determination output of the motion determination section 4 which will be described hereinafter.

The trimming section 1b performs trimming processing cutting out a part of the image data output from the imaging section 2. For the image data cutting-out, trimming images are generated sequentially for respective frames in different areas in the image data of a moving image (continuous shooting) shot in advance of still image shooting or after the still image shooting. The trimming processing is performed by cutting out plural parts such as a part far from and a position close to a face position detected by the face detection section 2a. By the cutting out, the trimming images are generated such that an enlarged image shrinks.

The above described control section 1 causes the recording section 6 to record the image data of the trimming image generated in the trimming section 1b and the image data obtained in the release operation. Further, the control section 1 determines a time available for displaying the generated trimming image according to a change time of face expression detected by the face detection section 2a.

The image processing section 5 takes in the image data output from the imaging section 2, and performs various kinds of image processing such as thinning processing, cut-out processing, resizing processing, edge enhancement processing, color correction, white balance adjustment and image compression, and performs the image processing, such as for displaying a moving image live view, for recording a still image and a moving image in the recording section 6, and for reproducing and displaying the still image and the moving image. In the image compression/decompression and the like, the image processing section 5 includes circuits for a still image and a moving image according to the respective types of processing, such as a still image compression/decompression circuit, and a moving image compression/decompression circuit.

Further, the image processing section 5 can temporarily store the full-size image data or the image-processed image data for each frame of the moving image shot for a predetermined time (e.g., about 0.5 seconds to 2 seconds) before or after the still image shooting. In particular, a first embodiment performs the trimming processing for the image data of the moving image obtained before the still image shooting in the trimming section 1b and temporarily stores this processed image data. This trimming processing will be described hereinafter by the use of FIG. 3 and FIG. 4.

The parameter setting section 3 causes a zoom button for changing a focal distance in the imaging section 2, an aperture value setting operation section for setting an aperture value, and the like, to perform the manual setting of shooting parameters and outputs the parameters to the control unit 1. Note that the aperture value and the like may be set automatically according to a photometrical result.

The parameter control section 7 controls the imaging section 2 according to the shooting parameters set manually or set automatically in the parameter setting section 3. By controlling the shooting parameters, it becomes possible to adjust exposure, a field angle, background blurring (depth of field), and the like.

The motion determination section 4 has a six-axis sensor or the like detecting total six-axis physical amounts of acceleration in three-dimensional space, that is, three-axis acceleration and rotational speed in three-dimensional space, that is, three-axis angular speed. This motion determination section 4 can determine whether the posture of the camera 10 is changed or not.

The operation section 9 includes various operation members such as a release button, a power switch, a reproduction button, and a menu button, and determines the operational states of these operation members and sends the determination result to the control section 1. The above control section 1 performs the control of photographing or reproduction in a predetermined sequence according to the operational state of the operation member. The recording section 6 records the image data of the still image or the moving image which is obtained by the imaging section 2 and compression-processed by the image processing section 5 when a shooting instruction is provided by the release button.

The display section 8 has a display monitor such as a liquid crystal panel or an organic EL panel disposed on the rear side of the camera 10, performs live-view display before shooting, reproduction-display of the recorded image, camera information display, and the like. A photographer can determine composition and timing while observing the live-view display. Further, the display section 8 displays the image obtained in the release operation and the trimming image. The clock section 11 performs clock operation and outputs shooting date and time information. This shooting date and time information is recorded together with the image data of the still image and the moving image when the image data is recorded in the recording section 6.

Next, a detailed configuration of the image processing section 5 will be described by the use of FIG. 2. The image processing section 5 takes in the image data output from the imaging section 2 and performs the various kinds of image processing such as the thinning processing and the resizing processing as described above, and, here, there will be mainly described a configuration related to the image processing for the image data of the moving images shot before or after the still image shooting.

The temporary recording section 5a is a memory for temporarily storing the image data from the imaging section 2, and has a memory (0) for temporarily storing the image data of the still image and a memory (−n) to a memory (−1) and a memory 1 to a memory n for temporarily storing image data sets corresponding to frames of the moving images (continuous shooting) shot for the predetermined time preceding this still image and for the predetermined time succeeding the still image, respectively. Here, the memory (−n) to the memory (−1) temporarily store the moving image for the predetermined time preceding the still image shooting, the memory 0 temporarily stores the image data of the still image, and the memory 1 to the memory n temporarily store the moving image for the predetermined time succeeding the still image shooting. Note that all of the memory (−n) to the memory n need not to always record the image data and only limited memories among them may be used for recording the image data of the still image and the moving image.

A time control section 5h inputs clock information from the clock section 11 and performs clock control for recording the image data of the moving image sequentially into respective memories in the above temporary recording section 5a with intervals of a frame update time. While in the present embodiment, the time interval for the image data temporary recording is determined so as to become one frame of the image data output from the imaging section 2, the interval may be several frames.

The memory 0 for temporarily storing the image data of the still image is connected to a still image compression section 5b. The still image compression section 5b performs image compression such as the JPEG. The memory (−n) to the memory (−1) and the memory 1 to the memory n storing the respective image data sets of the frames in the moving image (continuous shooting) are connected to an effect processing section 5e.

The effect processing section 5e performs the image processing so as to generate an image effect for the input image data of the moving image. A moving image compression section 5f performs the moving image compression by the MPEG 4, the motion JPEG, or the like on the image data image-processed by the effect processing section 5e.

A connection data section 5g combines the image data of the moving image generated by the moving image compression section 5f and the image data of the still image generated by the still image compression section 5b, and generates connection information for reproducing both of the image data sets continuously. The connection information by the connection data section 5g, the image data from the still image compression section 5b, and the image data from the moving image compression section 5f are sent to the recording section 6 and recorded as one image file. Obviously, the image data sets may be recorded in different files, respectively, and information associating the image data sets with each other may be recorded in either the still image or moving image file. Further, time information may be used instead. When the image data recorded in the recording section 6 is reproduced, it is possible to increase reproduction speed, to reduce the reproduction speed adversely, or to reproduce the image data in fast forward or in slow motion. Further, how many seconds the memory capacity of the temporary recording section 5a corresponds to changes depending on how many frames are shot in a second. The temporary recording section 5a is a memory to be used in such a freedom.

Next, the photographing and the reproduction of an image in the present embodiment will be described by the use of FIG. 3. While images 21a to 21d are shot sequentially in the photographing, among these images, the image 21d is a still image and the images 21a to 21c are a moving image photographed in advance of the still image shooting. A photographer obtains the still image 21d intending to photograph an object 22, but, when the image 21d is displayed from the start of the reproduction, there is not a time of enjoying what image will be displayed in the viewing and high expectation is not obtained.

Accordingly, the present embodiment does not reproduce and display the whole image including the face of the object 22 from the start, but first displays a part except the face and then makes the whole image appear gradually. Specifically, the present embodiment first reads out the image 21a enlarging a hand part from the image data recorded in the photographing and displays this image, subsequently reads out the image 21b having a wider area including the hand part and displays this image, then reads out the image 21c enlarging a face part and displays this image, and lastly reads out the image 21d capturing the whole object 22 and displays this image. Since a viewer has expectation of quickly knowing what (who) is photographed, it is possible to perform effective reproduction-display utilizing this mentality. That is, the present embodiment does not allow a part which is a concern of the viewer, such as who is photographed and what expression it has, to be known easily and intends to heighten the expectation. At this time, when additionally using expression change specific to a moving image, it is possible to perform rendering which increases a desire for knowing who is photographed by showing an instant movement of a smile on lips, for example.

The camera 10 of the present embodiment performs image data recording suitable for performing such reproduction-display. Obviously, the images 21a to 21c may be cut out from image data capturing the whole such as the image 21d, but this makes an uninteresting image without expression change and the present embodiment reproduces the images in the moving image expression.

Next, the photographing operation of the camera 10 in the present embodiment will be described by the use of a flow-chart shown in FIG. 3. When the flow of the moving image shooting starts, first it is determined whether photographing is to be performed or not (S1). Since a photographer operates the release button in the operation section 9 when having determined composition while observing the live view display in the display section 8, it is determined here whether the release button has been operated or not.

When the determination result in Step S1 does not show the photographing, subsequently it is performed in Steps S2 to S4 to obtain images corresponding to the images 21a to 21c, respectively. First, an under-face part 1 is subjected to trimming photographing (S2). Here, a part under the face part of the object 22, a hand part in this example, is cut out by the trimming of the full-size image data (e.g., 12M (12 million pixels)) by the trimming section 1b to have a size of 2M (2 million pixels) and the image data corresponding to the image 21a is temporarily recorded in the memory of the temporary recording section 5a.

Here, while the number of pixels is determined to be 2M assuming a case of reproducing and displaying the image in the high vision image, the number of pixels may be determined to be a different value according to an assumed reproduction-display apparatus. In the trimming processing, an image size is suppressed so as to match the size of the display section for the purpose that the image can be displayed filling a screen without an unused area, but the image data may have a half of this image size when rendering allows the image size to be a half of the screen size. For a smaller size, handling is easier and freedom in the movement of the trimming position can be increased. A larger size image may not be displayed fully and a part thereof may be wasted. Note that the posture of the camera 10 is detected by the motion determination section 4 or the like and it is determined from this detected camera posture whether the part is located under the face or not.

Subsequently, an under-face part 2 is subjected to the trimming photographing (S3). Here, a range which is located on the upper side of the under-face part 1 and also has a wider area than the under part 1, a part including the hand part and wider than the under part 1 in this example, is cut out by 2M trimming of the full-size image data and image data corresponding to the image 21b is temporarily recorded in the memory of the temporary recording section 5a.

After the photographing of this under-face part 2, an under-face part 3 is subjected to the trimming photographing (S4). Here, a range which is located on the upper side of the under-face part 2 and also has an area equivalent to that of the under part 2, an enlarged part including the face part in this example, is cut out by the 2M trimming of the full-size image data and image data corresponding to the image 21c is temporarily recorded in the memory of the temporary recording section 5a. After the temporary recording has been completed, the process returns to Step S1.

While, the trimming processing is performed to cut out the parts (under parts 1 to 3) from the full-size image data in this manner in Steps S2 to S4, the continuity of these images needs careful consideration. In the present embodiment, the face part appears gradually and thereby the face size changes in the direction of becoming smaller (enlargement to shrink) when the face size in the image 21c and that in the image 21d are compared. Accordingly, also among the images 21a to 21c, preferably the relationship of the enlargement to shrink is not disturbed. Note that, in the case of the transition from the image 21b to the image 21c, only the trimming position is shifted in a state without a change in the enlargement rate. While the enlargement rate is made to change in a constant direction in this manner, preferably the change of the trimming position is moved also in a constant direction and is not reversed.

When the determination result in Step S1 shows the photographing, subsequently still image shooting is performed (S11). Here, full-size image data (12M (12 million pixels)) of a still image output from the imaging section 2 is recorded in the recording section 6.

After the still image shooting, the deletion of an unnecessary image is performed (S12). Here, in Steps S2 to S4, the image data temporarily recorded in the temporary recording section 5a is deleted except the image data to be recorded finally in the recording section 6. The trimming photographing in Steps S2 to S4 is performed repeatedly until the still image shooting is performed in Step S11, and only the trimming images immediately before the still image shooting is recorded in the recording section 6. Accordingly, in Step S12, the trimming image and the like which have not been recorded in the recording section 6 is deleted. Note that the trimming image which is to be temporarily recorded but exceeds the maximum recording capacity of the temporary recording section 5a is deleted in the processing of Steps S2 to S4. After the deletion of the unnecessary image, the moving image shooting flow is terminated.

The image data sets of the trimming images in the under-face parts 1, 2 and 3 and thus the still image are recorded in this manner, and the image data sets are read out in the order of the under-face part 1, the under-face part 2, the under-face part 3 and the still image, and reproduced and displayed. That is, it is possible to start from a part, to move the part, and lastly to display the whole image in the release operation.

The present embodiment first performs the trimming for the under-face part and moves the trimming position upward to the face position. This is because, when starting from above the face as starting from an image of the sky which is not related to the person, it is frequently difficult to heighten expectation. Generally assuming a case of a standing person or sitting person, the under-face part is first cut out by the trimming in a viewpoint of giving preference to a part related to the person. The trimming position may be moved along a part such as a hand and a foot by the utilization of person profile information or skin color information to heighten expectation. In order to display the whole face after having displayed expression change as far as possible, it is preferable to show a part easily changed by the expression such as an eye and a mouth in close-up before displaying the whole face.

Further, in a case of photo album which photographs the same person, who is photographed, is known and the expression change tends to become monotonous. Accordingly, when the same person is continued, the trimming position may be controlled to be shifted from a part of clear color except a face to the face. Note that the image cut-out by the trimming is made to fit in the display section by resizing.

By the use of FIG. 4, there will be described a relationship between the temporary recording and the final recording of the images in the moving image shooting and the still image shooting described by the use of FIG. 3. The full-size image data photographed at time T1 to time T8 is shown in a line corresponding to "Photographing (full)" of FIG. 4. The control section 1 and the image processing section 5 generate a live-view image from this image data and display the live-view image in the display section 8. The live-view image is generated in the number of pixels corresponding to that of the display section 8 by the resizing or thinning processing.

Further, by the trimming processing performed using the full-size image data, trimming image data is generated for the temporary recording. As shown in FIG. 4, the trimming images are generated at three positions within a screen from one full-size image data frame, and these trimming images are temporarily recorded in the temporary recording section 5a. Note that, in the present embodiment, the number of pixels in the trimming image is 2M as described above.

Figure 3:
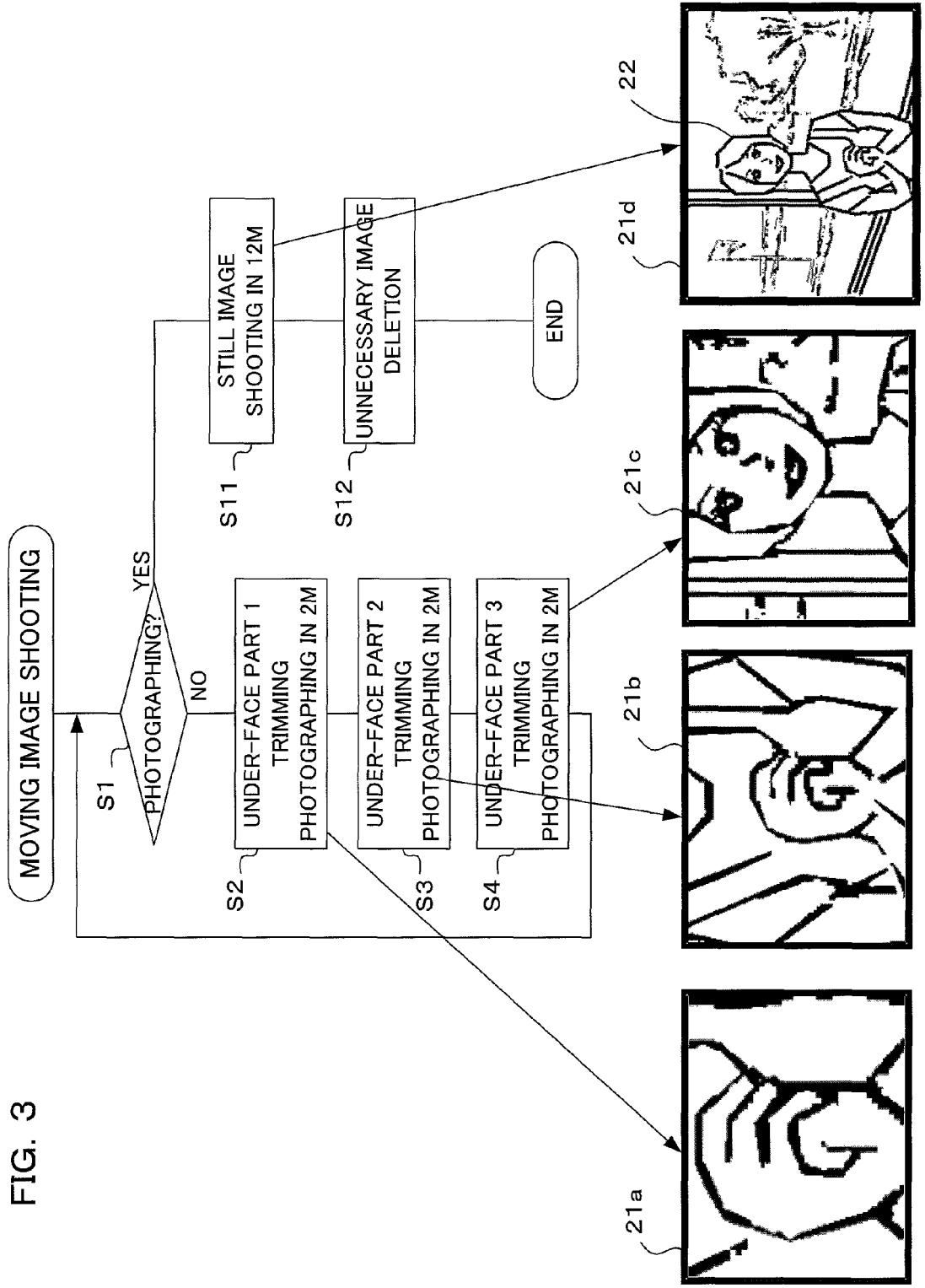
FIG. 3 is a diagram showing a procedure of still image shooting and moving image shooting performed in advance of the still image shooting, in a camera according to a first embodiment of the present invention.
Figure 4:
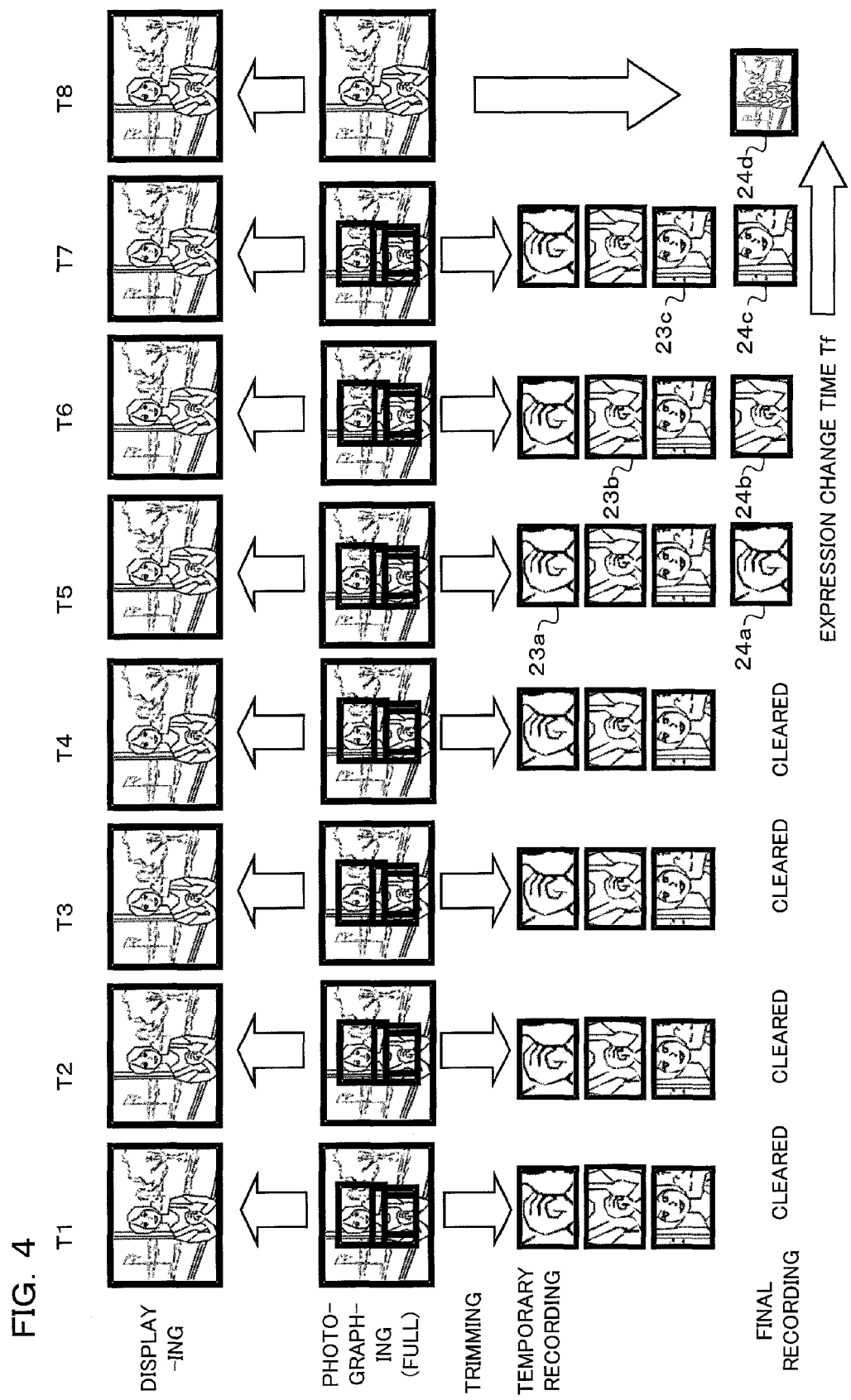
FIG. 4 is a diagram showing a relationship among still image shooting, a display in moving image shooting which is performed in advance of this still image shooting, and an image to be recorded, in a camera according to a first embodiment of the present invention.

In the example of FIG. 4, the still image shooting is performed at the time T8 (corresponding to the timing of S11 in FIG. 3). The full image data of the still image 24d obtained at this timing is recorded finally in the recording section 6. Further, the trimming image temporarily recorded at the time T5 to T7 immediately before the time T8 is also recorded finally in the recording section 6.

In the final recording of the image data of the trimming image, the trimming image data 23a temporarily recorded at the time T5, the trimming image data 23b temporarily recorded at the time T6, and the trimming image data 23c temporarily recorded at the time T7 are finally recorded as final trimming image data sets 24a, 24b and 24c, respectively. The trimming image data sets temporarily recorded at the time T1 to T4 except the above trimming image data sets and the trimming image data sets temporarily recorded at the time T5 to T7 except the trimming image data sets 23a to 23c are deleted as unnecessary images.

In this manner, the camera 10 of the present embodiment shoots the still image at the time T8 and records the trimming image data temporarily recorded immediately before the still image shooting as the final image. Further, in the reproduction of the finally recorded image data, the reproduction starts from the part of the object 22 as explained by the use of FIG. 3 and finishes in displaying the whole image of the object 22 in the end. That is, in the reproduction, the reproduction starts from the part under the face, moves gradually to the face part in a moving image while usually providing expectation to know who is the person existing in the image, and finishes in displaying the whole still image. Accordingly, it is possible for anybody to easily photograph, reproduce, and display a colorful image with variety by combining the moving image and the still image.

Note that the image data of the trimming image is generated from the full-size image data. In the trimming, the original image data from which a part of the image data is cut out preferably has a larger number of pixels, but, when there is no problem in the number of pixels or the like of an assumed display apparatus, the image data does not always have a full size and the resized or thinned image data may be used. Further, even when the full-size image data is finally recorded, the image data obviously needs to be resized according to a screen size to display the image data. The still image is recorded in a full size for the purpose of printing or partial enlargement, and the still image is resized according to the size of the display section when the image is provided with the moving image effect as in the present embodiment and reproduced and displayed in a display section of a camera with a liquid crystal monitor, a television, a mobile phone, or the like.

Further, while the present embodiment shows an example of heightening expectation for the still image, the present embodiment can be applied also to a case in which a person appears in the moving image, as a technique of heightening expectation. In this case, the moving image may be shot continuously instead of the still image.

The present embodiment generates the trimming image from the moving image before the still image shooting and thereby can reproduce the expression change of the face image. For this reason, more pleasant image is obtained when the expression change of the face image is viewed more clearly. Accordingly, it is preferable to obtain the image data as capturing the expression change of the face part at the time T7 immediately before the still image shooting. Further, the timing of the time T5 and T6 may be determined according to the expression change time (expression change time Tf in FIG. 4).

Figure 5:
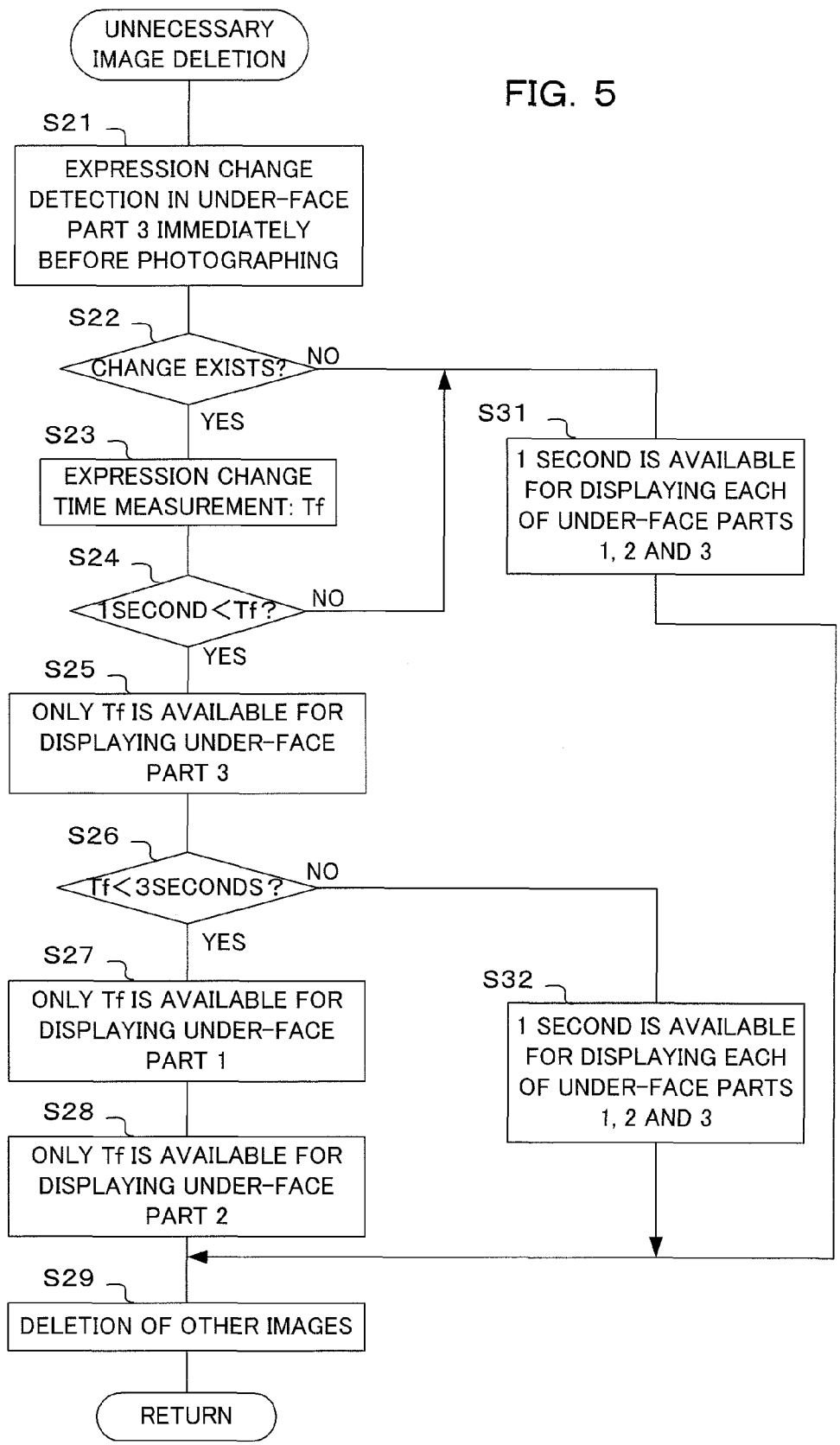
FIG. 5 is a flowchart showing the operation of unwanted-image deletion, in a camera according to a first embodiment of the present invention.

By the use of FIG. 5, there will be explained an unnecessary image deletion flow for reproducing an image by utilizing such amusingness of the expression change in the face image at the under part 3. This flow is a subroutine of Step S12 (refer to FIG. 3) and, when this flow is to be carried out, the expression change time Tf is preliminarily measured during the trimming photographing of the under-face part 3 in Step S4 (refer to FIG. 3) and this time Tf is stored. Note that the expression change time Tf is a time from a serious face to a smile, for example, and the face detection section 2a is enabled to detect face expression together with detecting the face part and obtains the expression change at this time.

In this manner, the face expression can be monitored before the photographing and, when maximum value information of smile data in the face expression is stored in the recording section, the release can be performed automatically without user's release operation. In this case, the best smile can be recorded as a final image and also anybody can perform photographing which captures the expression change up to the smile. Since the camera may be only directed to the object, it is possible for a beginner to perform appealing moving image shooting.

Note that the measurement of the expression change time Tf may be performed after the photographing as described hereinafter. In this case, while the expression can be selected according to user's preference, the expression is not always changed immediately before the photographing and an expression change part before a state without expression change is searched for and the time until the photographing is determined to be Tf.

When the unnecessary image deletion flow starts, first the expression change of the under-face part 3 immediately before the photographing is detected (S21). This step compares the trimming image of the face in the object 22 corresponding to the under part 3 at the time T7 and the trimming image of the face in the object 22 at the time T6 immediately before the time T7, for example and determines whether expression change exists or not. Note that, when further more sets of the image data are stored in the time between the time T6 and T7, these image data sets may be compared with one another.

Subsequently, it is determined whether the expression change has occurred or not (S22). Since the expression change has been detected in Step S21, the determination is performed based on this detection result. When the expression change has occurred in this determination result, the expression change time is measured and determined to be Tf (S23). By the use of this expression change time Tf, the display time of images of the under parts 1, 2 and 3 is controlled when the expression change occurs in Step S24 or the following steps.

After the expression change time Tf is obtained, it is determined whether or not the expression change time Tf is longer than one second (S24). When the expression change time is longer than one second in this determination result, the control section 1 allows the image of the under face part 3 to be displayed for the expression change time Tf (S25). Subsequently, it is determined whether or not the expression change time Tf is shorter than three seconds (S26).

When the expression change time is shorter than three seconds in the determination result of Step S26, the control section 1 allows the image of the under-face part 1 for the expression change time Tf (S27), and allows the image of the under-face part 2 for the expression change time Tf (S28). Thereby, the display time for each of the images of underparts 1, 2 and 3, that is, the display time for each image displayed using the final trimming image data sets 24a to 24c becomes the expression change time Tf, and this expression change time Tf is recorded finally together with the image data of the trimming image as the display time. The trimming image changes with the same time interval as the time in which the expression of the object 22 changes, and thereby it is possible to enjoy a process of appealing expression change.

On the other hand, when the expression change is not found in the under-face part 3 immediately before the photographing in the determination result of Step S22, or when the expression change time Tf is longer than one second in the determination result of Step S24, each of the images of under-face parts 1, 2 and 3 is allowed to be displayed for one second (S31). Even without the expression change, each of the trimming images is allowed to be displayed for one second for the purpose of heightening expectation in the reproduction-display.

Further, when the expression change time Tf is longer than three seconds in the determination result of Step S26, each of the images of the under-face parts 1, 2 and 3 is allowed to be displayed for one second (S32). When a long time is required for the expression change and the trimming image is changed with an interval of this expression change time Tf, the image display time becomes too long and the display interval is determined to be one second.

After above Steps S28, S31 and S32 have been carried out, the other images are deleted (S29). Here, the images temporarily recorded in the temporary recoding section 5a except the image remained for the final recording are deleted. After the deletion, the process returns to the original flow.

In this manner, since the time for the reproduction-display of the trimming image is recorded together with the image data in the present flow, the trimming image is displayed for this recorded reproduction time in the reproduction-display. Particularly when the trimming image is reproduced for the expression change time Tf, expression changes in the same time as that required from a serious face to a smile, and this allows the image reproduction to heighten expectation and also realistic sensation. Note that, while the present flow uses one second or three seconds for a time to be compared to the expression change time Tf, this is an illustration and the time to be compared is not limited to this case if the time is appropriate for reproducing an image which heightens expectation and also realistic sensation.

Next, by the use of FIGS. 6A and 6B, there will be explained an example of displaying the finally recorded trimming image (refer to FIG. 4) on a sub-screen provided in the display section 8. It is configured such that a sub-screen 8b is provided at the side of a main screen 8a in the display section 8 as shown in FIG. 6A, and the finally recorded trimming image and the still image are displayed on this sub-screen 8b. That is, on the sub-screen 8b, the trimming images 26a to 26c are displayed and also the still image 26d is displayed. By displaying the photographing result on the sub-screen 8b in this manner, the effect can be confirmed. Note that the trimming images recorded in the temporary recording section 5a before the still image shooting may be sequentially read out and displayed. In this case, while the still image cannot be displayed, the trimming image can be predicted in advance.

Further, only one image may be allowed to be displayed on a sub-screen 8c as shown in FIG. 6B, and the trimming images and the still image may be reproduced and displayed sequentially on this sub-screen 8c. In this case, the images can be reproduced and displayed in the same temporal sequence as that in the actual reproduction-display, and thereby it is possible to enjoy the expectation until the still image is displayed.

Next, a variation of the first embodiment in the present invention will be explained by the use of FIG. 7. The first embodiment generates both of the image data for the display on the display section 8 and the image data of the trimming image to be temporarily recorded in the temporary recording section 5a, from the full image data at the time T1 to T8. However, this variation performs thinning photographing at time T11, T13 and T15 and generates the image data for the display using the image data at this time. Further, the variation is configured to obtain the full-size image data at time T12, T14 and T16 and generates the image data of the trimming image using this image data.

When both of the image data for the display and the trimming image for the temporary recording cannot be generated in a high speed from the full image which is photographed according to a frame rate of the display section 8, the full-size image data may be obtained discretely so as to increase speed as in the present variation. Also in this case, the image data of the trimming image generated from the full-size image is temporarily recorded in the temporary recording section 5a. Then, at time T18, the image data of the still image is recorded finally and also the image data of the temporarily recorded trimming images immediately before the still image (time T12, T14 and T16) is recorded finally.

As explained above, in each of the first embodiment of the present invention and the variation thereof, the image data is obtained by the continuous shooting in advance of the still image shooting, and the trimming is performed on plural positions in the image data, and the trimmed plural image data sets are temporarily recorded. Then, the image data selected from among the image data of the latest temporarily recorded trimming images is finally recorded together with the full-size image data of the still image in the recording section 6.

When the image data thus recorded is reproduced, the whole object is not reproduced or displayed suddenly but the whole object is reproduced and displayed after the reproduction-display of a part of the object. At this time, it is possible to reproduce the expression at that time by recording the expression change or the like. Hence, it is possible to heighten expectation while enjoying the expression by enlarging only a part of the screen and predicting or imagining what (who) is photographed during a time until the whole object is displayed.

Note that this technique can be applied to screen transition and can be used not only for the still image shooting but also for the cut dividing transition of a moving image. Further, this moving image part may be utilized not only for expressing the expectation but also for expressing reluctance to finish in the end of the image display. At this time, exposure compensation may be performed together with image processing. Moreover, the present embodiment temporarily records the image data of the trimming image in the temporary recording of the moving image (continuous shooting), and thereby can reduce the capacity of the temporary recording section 5a compared to the case of temporarily recording the full image data.

Next, a second embodiment of the present invention will be described by the use of FIG. 8 to FIG. 10C. The first embodiment generates the trimming image from the full-size image data at each time and temporarily records this trimming image. On the other hand, the second embodiment is configured to temporarily record the full-size image data at each time or at each frame and to cut out a predetermined part of the temporarily recorded full-size image data by trimming and record the part finally at the time of the still image shooting.

Figure 2:
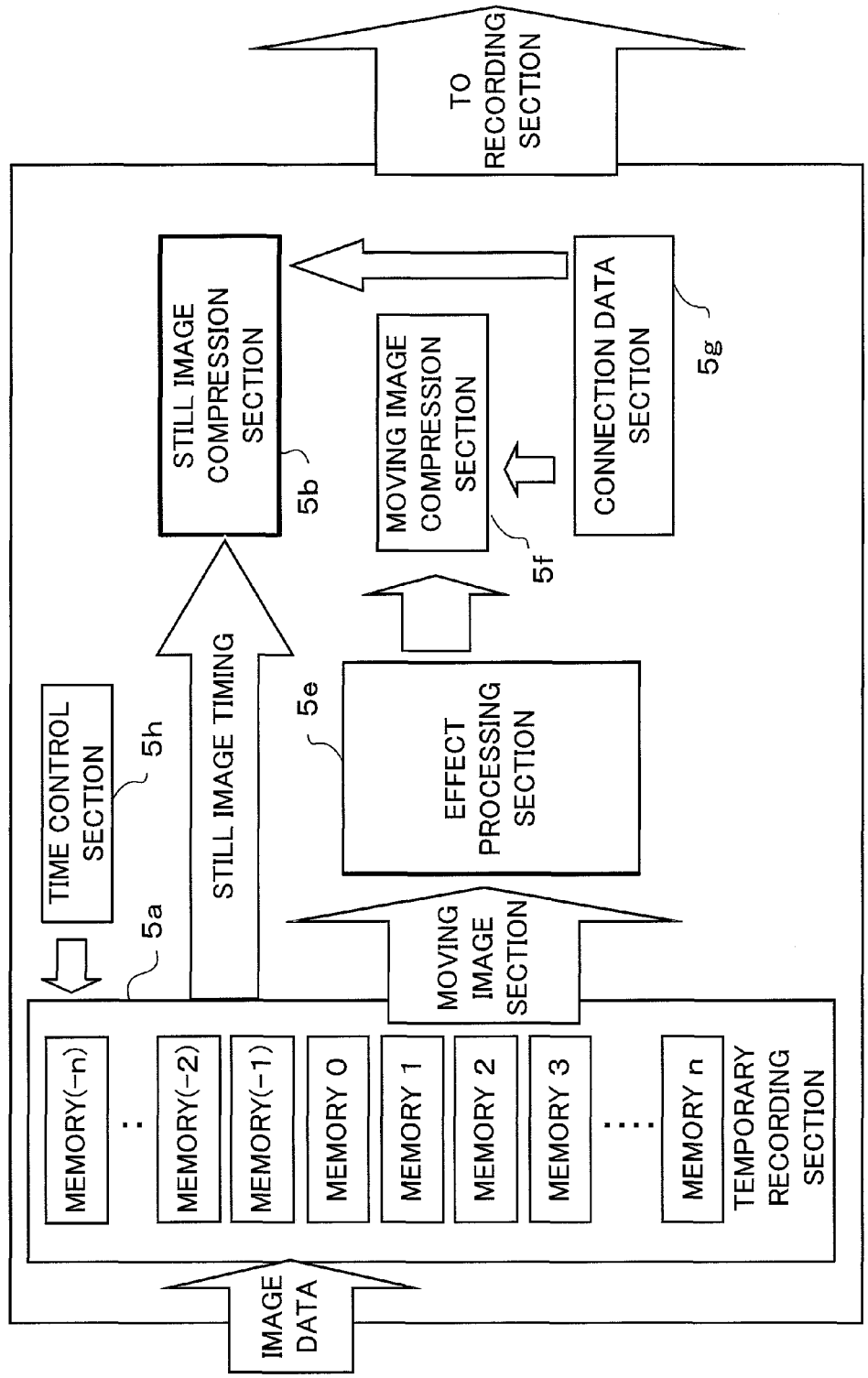
FIG. 2 is a block diagram showing details of an image processing section in a camera according to a first embodiment of the present invention.

The configuration of the second embodiment is the same as that of the first embodiment shown in FIG. 1 and FIG. 2, and detailed explanation thereof will be omitted. Note that there is a different point that the memory for recording the moving image in the temporary recoding section 5a temporarily records the image data of the trimming image in the first embodiment but records the full-size image data in the present embodiment.

Figure 8:
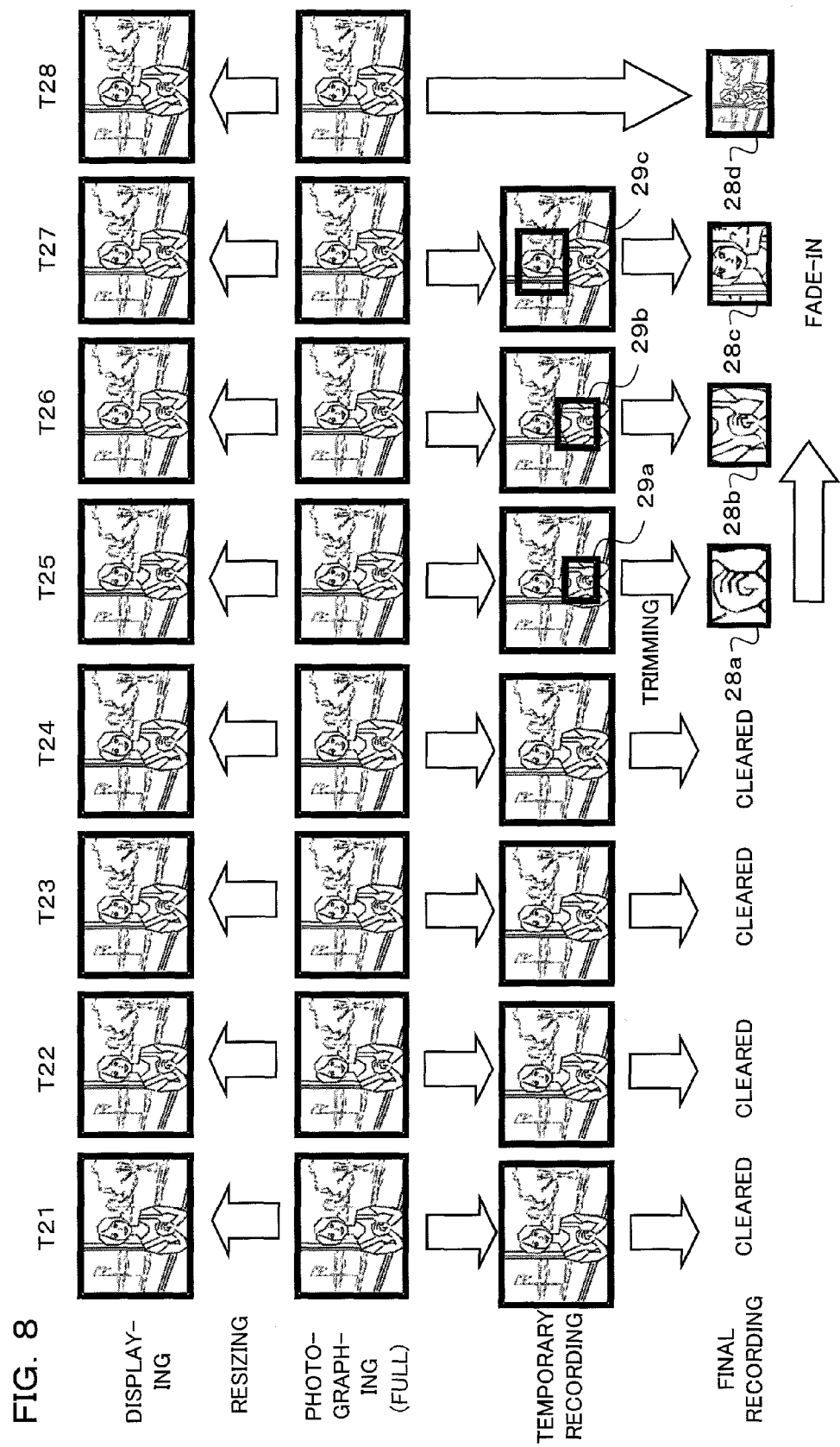
FIG. 8 is a diagram showing a relationship among still image shooting, a display in moving image shooting which is performed in advance of this still image shooting, and an image to be recorded, in a camera according to a second embodiment of the present invention.

As shown in FIG. 8, in the present embodiment, the imaging section 2 obtains the image data in the full size and generates the image data for the display by resizing this full-size image data at each of time T21 to T27. Further, the full-size image data is temporarily recorded at each time or at each frame. When the still image shooting has been performed at time T28, the predetermined part is cut out by the trimming of the full-size image data temporarily recorded at each of the time T25 to T27 immediately before the still image shooting. The final trimming image data sets 28a to 28c of the trimming images generated at these time points, respectively, and the still image full image data 28*d* at the photographing are finally recorded in the recording section 6.

Further, in the trimming, a trimming frame is moved from 29*a* to 29*c*, that is, from a part far from the object (hand part in this example) to a part of the face and also the trimming frame 29*b* is determined to be larger than the trimming frame 29*a* and the trimming frame 29*b* and the trimming frame 29*c* are determined to have the same size.

Note that the trimming images may be generated so as to fade in. That is, for making the image of the still image appear clearly, the trimming image data 28*a* is subjected to exposure compensation so as to be over-exposed while the still image full data 28*d* is appropriately exposed. The exposure compensation is performed by the parameter control section 7 or the image processing section 5.

In the second embodiment, the final trimming image data sets 28*a*, 28*b* and 28*c* and the still image full image data 28*d* are recorded in the recording section 6 in this manner, and, in the reproduction, the final trimming image data is read out in the order of the final trimming image data 28*a*, the final trimming image data 28*b*, and the final trimming image data 28*c*, and the final trimming data sets are reproduced sequentially. Then, lastly the still image full image data 28*d* is read out to be reproduced and displayed. Accordingly, a part of the object is first reproduced, then the part of the object is moved, and lastly the whole object is reproduced and displayed.

While the number of the trimming images is three in the explanation of FIG. 8, it may be configured such that more trimming images are generated and reproduced so as to move smoothly. The flowchart of trimming range shown in FIG. 9 is a flow for generating a large number of trimming images not limited to three.

In the moving image shooting flow of the second embodiment, the full-size image data is temporarily recorded in Steps S2 to S4 of the flow shown in FIG. 3 in the first embodiment. The number of these image data sets to be temporarily recorded is determined to be the number of the image data sets which can be temporarily recorded in the memory of the temporary recording section 5*a*. Then, when shooting instruction is performed in Step S1, the still image is shot in Step S11. In the second embodiment, the unnecessary image deletion subroutine of Step S12 in FIG. 3 is replaced by the trimming range subroutine shown in FIG. 9.

Figure 9:
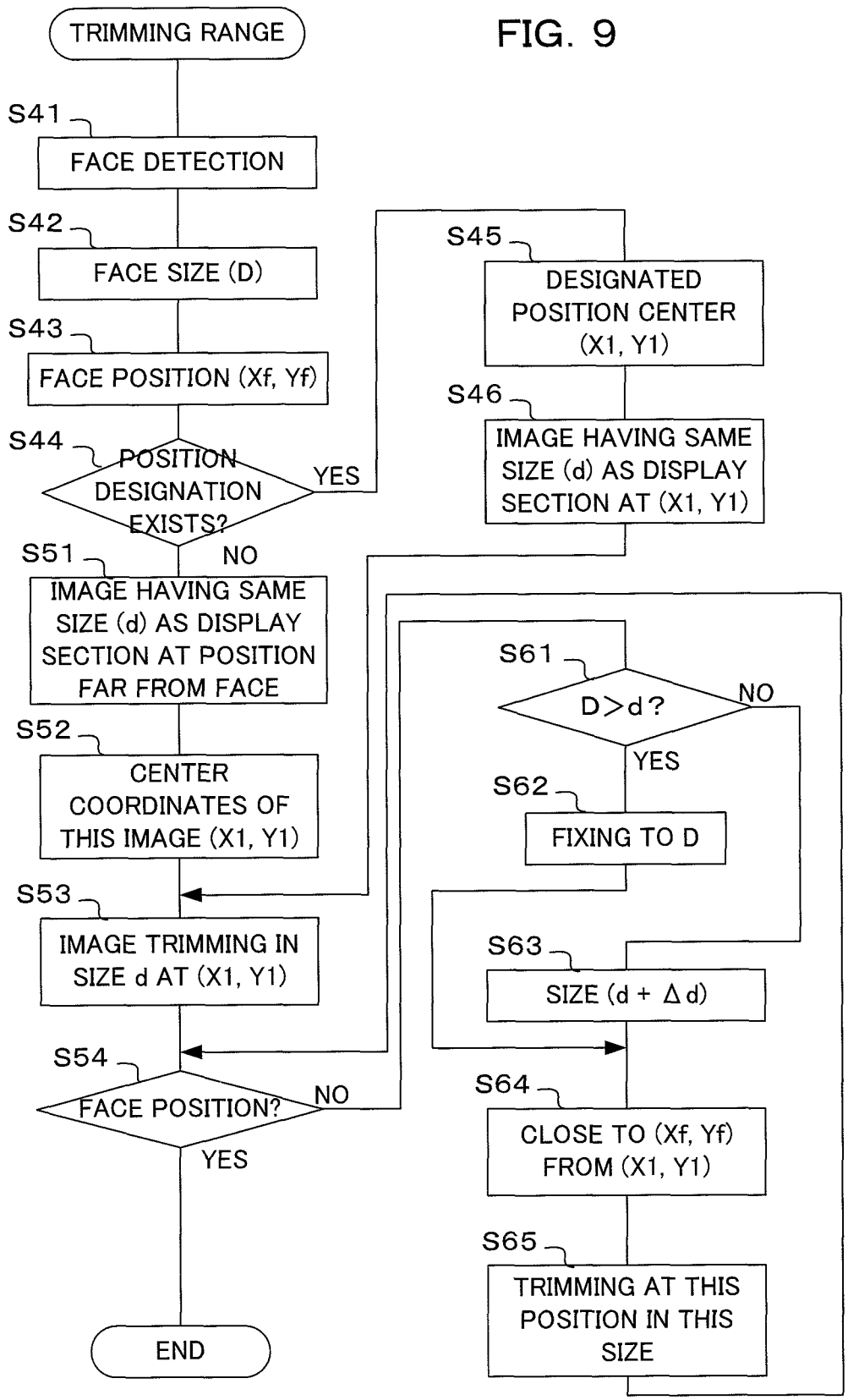
FIG. 9 is a flowchart showing operation of changing a trimming range, in a camera according to a second embodiment of the present invention.

When the trimming range flow shown in FIG. 9 starts, first face detection is performed (S41). In this step, the face detection section 2*a* detects whether a face is included or not in the image data of the still image temporarily recorded in the memory 0 of the temporary recording section 5*a*. Subsequently, face size (D) detection is performed (S42). When having detected that a face is included, the face detection section 2*a* detects the size of the face in this step and the detected size is denoted by D. Next, a face position is detected (S43). In this step, the face detection section 2*a* detects the position of the detected face and the detected face position is denoted by (Xf, Yf).

Subsequently, it is determined whether position designation exists or not (S44). Here, for an initial position of the trimming image, it is determined whether or not a user has designated the position manually. For the position designation method, the position may be designated by a touch to an initial position of the trimming image as shown in FIG. 6B, for example, when the still image is displayed on the main screen 8*a*. In this case, the user's touch operation is detected by a touch panel or the like which is not shown in the drawing. Further, a cursor may be moved by the operation of a cross button or the like and the position may be determined by an OK button or the like.

When the position designation exists in the determination result of Step S44, subsequently the center of the designated position is obtained (S45). In this step, the coordinates of the position on the screen designated by the touch panel, the cross button, or the like are obtained and denoted by (X1, Y1). Subsequently, an image size is determined to be the same as that of the display section (d) at the designated position coordinates (X1,Y1) (S46). In this step, the size d is determined to be approximately 2M in the assumption of displaying in the high-vision image, but may be determined to be another value according to an assumed display section.

When the position designation does not exist in the determination result of Step S44, subsequently an image having the same size (d) as that of the display section is determined at a position far from the face (S51). The position far from the face, in other words, the center coordinates of a position located apart from the face is determined in following Step S52, but the position far from the face may be determined to be a farthest part among the human parts except the face, such as characteristic parts like a hand by image analysis.

The determination method of this position far from the face is not limited to this method and may be any method in which the image is moved from the position different from that of the face. Another example will be described hereinafter by the use of FIGS. 10A to 10C. Further, as described in Step S46, the size of the trimming image d is determined to be the same as that of the display section. The size of the trimming image is determined to be 2M if the high-vision image is required.

Subsequently, the center coordinates of the image (X1, Y1) are determined (S52). Here, since the position far from the face has been determined in Step S51, the center coordinates of this position are obtained.

After the center coordinates have been obtained in Step S52, or when the size d has been determined in Step S46, the image having the size d is trimmed at the coordinates (X1,Y1) (S53). The trimming section 1*b* performs the trimming of the full-size image data here in the size d centering the coordinates (X1, Y1).

After the trimming processing in Step S53, it is determined whether the current position is the face position or not (S54). While the trimming processing is performed first at the center position (X1, Y1), the coordinates are moved in Step S64 as described hereinafter. In this Step S54, it is determined whether or not the current position has reached the face position (Xf, Yf).

When the current position is not the face position in the determination result of Step S54, subsequently it is determined whether or not the face size D is larger than the size d of the trimming image (S61). When the face size D is smaller than the image size d in this determination result, subsequently the size d is set to be (d+Δd) (S63). That is, the size d is increased by Δd. The reason is that the trimming image size is d when the trimming is first performed but the trimming image size is to be gradually increased by each Δd so as to lastly match the face size D.

When the face size D is larger than the image size d in the determination result of Step S61, the image size d is fixed to the face size D (S62). The reason is that the trimming part is not to become larger than the face size. This prevents that the face appears to be shrunk and a viewer is concerned about the size change more than the expression change when the image size d becomes larger than the face size D. Thereby, it is possible to enjoy the expression without changing the face size on the screen. The present embodiment is configured to show a part in a moving image before showing the whole image. That is, the present embodiment has a scheme so as to show a part except the face first and to show the expression change in close-up when showing the face. Accordingly, the present embodiment emphasizes a composition change from a close-up face to the whole image (telephoto-to-wide direction), and, when showing the face from a part except the face, makes its direction the same and targets a natural zooming effect. However, such restriction may not be always necessary when further screen change is pursued.

When the image size d has been fixed to D in Step S62, or when the image size d has been increased to d+Δd in Step S63, subsequently, the trimming image is made to come close to the face position (Xf, Yf) from the initial position (X1, Y1) (S64). That is, the center position of the trimming image is moved gradually. While the moving speed in this case is determined by the control section 1 to be a speed in which the trimming image can move in approximately 0.5 seconds to 2 seconds from the initial position of trimming to the face position, the speed may be slower or faster depending on user's preference.

Subsequently, the trimming is performed at this move position in this image size (S65). Here, the trimming section 1b performs the trimming of the full-size image data at the position determined in Step S64 and also in the image size determined in Step S62 or S63, and the image data of the trimming image is recorded finally in the recording section 6.

After the trimming in Step S65, the process returns to Step S54 and the trimming processing is repeated until the face position is reached while the image size d and the trimming position are changed. When the face position is reached in the determination result of Step S54, the trimming range processing is terminated and the process returns to the original flow.

In this manner, the trimming image is cut out from the full-size image data while the image size is being changed from the center position (X1, Y1) determined in Step S45 or S52 to the face position (Xf, Yf) in the trimming range flow, and this cut-out trimming image is recorded finally. This flow can generate a large number of trimming images easily not limiting the number to three, and thereby the trimming image can be generated so as to slide smoothly from the initial position (X1, Y1) to the face position (Xf, Yf).

Further, the present flow causes the trimming image to come close to the face in Step S64 after having changed the size thereof in Step S63. This is performed in order to enjoy the expression change in a state after the image size has been lastly arranged to have a frame size corresponding to the face in close-up. Further, when the trimming image is first moved to the face position and then the size is changed, it becomes clear from the first who is the person and it is difficult to provide the expectation. Accordingly, the trimming image is moved to the face position lastly. However, since there exists a scene or a user to pursue the adverse effect, Step S61 and S54 may be designated to be reversed in the order.

Note that, while the trimming range flow has been explained to be carried out in the photographing, the trimming range flow can be also carried out in the reproduction. That is, the full-size image data may be recorded in the recording section 6 for the moving image (continuous shooting) within a predetermined time before the still image shooting, the trimming range flow shown in FIG. 9 is carried out in the reproduction to cut out the trimming images, and these cut-out trimming images may be reproduced and displayed sequentially. Further, while the image data recorded in the temporary recording section 5a before the photographing has been explained to be the full-size image data, it is optional to use the image data smaller than the full-size image data, considering the image size of a display section in an assumed reproduction apparatus.

Next, another example will be explained by the use of FIGS. 10A to 10C for the determination method of the position far from the face in Step S51. There is a method of simply selecting a part of a person farthest from a face, other than the method of determining a particular position such as a hand part for the position far from the face by image analysis. In this case, there arises a problem that, when this position is too far from the face position, the movement from the initial position to the face position requires a long time and causing the image to become boring in viewing. Accordingly, this example determines the trimming start position and the frame moving speed so as to create the effect of providing expectation in the viewing.

Figure 10A:
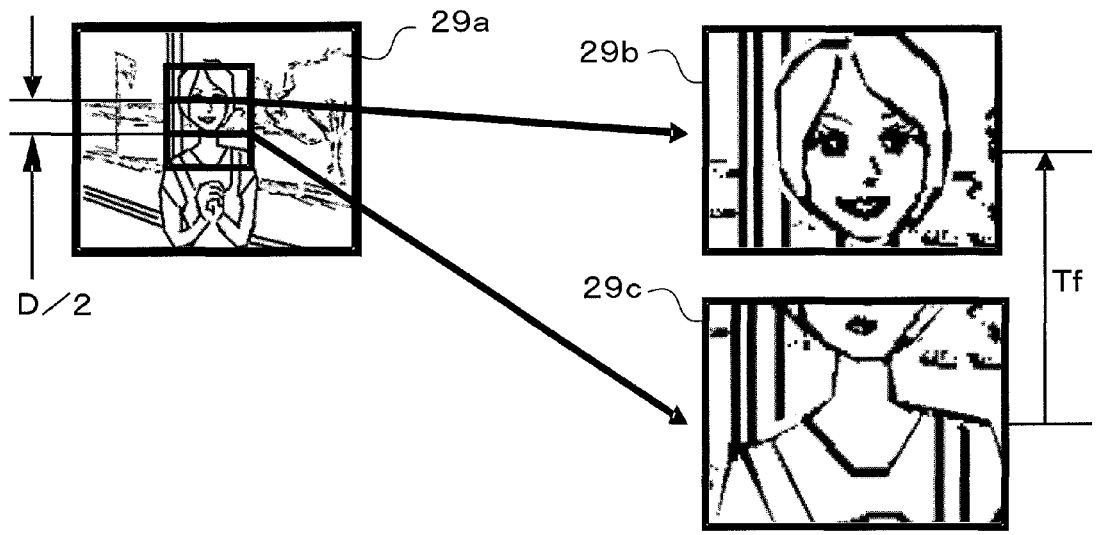
FIGS. 10A to 10C are diagrams illustrating a state of moving a trimming range according to an expression change time in a camera according to a variation of a second embodiment in the present invention.

FIG. 10A shows a whole image 29a in the moving image shooting and trimming images 29b to 29d at this time. In this case, as in the above embodiment, the trimming image is moved from a position far from a face to a face part. The trimming image 29c shows a part under the face of an object who does not smile in this state. However, the trimming image 29b shows the whole face of the object who is smiling in this state. The time Tf is measured from the state of not smiling to the state of smiling. By dividing a distance difference from the end of the face to the center of the face (approximately D/2) (here, D is a face size) by the time Tf, a moving speed v can be calculated. When a position corresponding to a movement with this moving speed v for a predetermined time (e.g., approximately 2 seconds) is determined to be the trimming start position, it is possible to perform the reproduction-display of the trimming image and the still image according to the timing of the expression change in the object.

Figure 10B:
Figure 10C:

FIGS. 10B and 10C show such states of the trimming position and the expression change, respectively. FIG. 10B has a vertical axis of the trimming position and a horizontal axis of time elapse, and shows a state in which the trimming frame is moving with time. Further, FIG. 10C has a vertical axis of numerically-expressed expression and a horizontal axis of time elapse and shows a state in which the face expression of the person changes with time. Here, the expression numerically expresses a change in an eye size, a picked-up state of a mouth end part, or the like. Since a higher value of this expression means a high smile degree and a part having a large change in this value indicates a process to the smiling, a trimming line 29e may be determined such that the trimming frame moves from the lower end part of the face to the center of the face just in the time Tf which is obtained from this part having a large change.

By determining the trimming start position and the trimming frame moving speed in this manner, it is possible to enjoy the expression change of the face in the object. Further, since the trimming has been performed, it is possible to enlarge the expression change for the display.

Note that there is a case without the expression change depending on the object and, in this case, it is optional to heighten expectation by changing the photographing position to a position except the face in order to cause the screen to have variety. This example can be utilized also to the first embodiment not limited to the second embodiment. That is, since the expression change is monitored in this example, the photographing may be performed automatically or a photographing chance may be displayed when the expression change occurs, in the first embodiment.

As explained above, each of the second embodiment of the present invention and the variation thereof obtains the image data of the moving image (continuous shooting) in a full size in advance of the still image shooting and temporarily records the image data as it is. Then, each of them generates the image data of the trimming image from the image data of the latest moving image in a full-size or the like in the still image shooting and records this generated image data and the image data of the still image finally in the recording section 6.

In the reproduction of the image data thus recorded, as in the first embodiment, the whole object is not reproduced and displayed suddenly but is reproduced and displayed after a part of the object has been reproduced and displayed. Accordingly, it is possible to imagine what (who) is photographed and to heighten expectation during the time until the whole object is displayed.

Further, the present embodiment temporarily records the image data in a full size or the like and requires the high-capacity temporary recording section 5a compared to the case of temporarily recording the trimming image. However, the present embodiment has a higher freedom in generating the trimming image after the still image shooting and can obtain an image further heightening expectation.

Further, the present embodiment may generate the trimming image in the reproduction of the image without generating the trimming image after the still image shooting. In this case, the generation of the trimming image for the reproduction may be performed in an image reproduction apparatus such as a personal computer, for example, as well as in the camera.

Next, a third embodiment of the present invention will be described by the use of FIG. 11 to FIG. 14F. In the first and second embodiments, the moving image (continuous shooting) is always recorded temporarily in the temporary recording section 5a in advance of the still image shooting. This third embodiment is configured to shoot the moving image (continuous shooting) after the still image shooting, generate the trimming image from the image data of the moving image obtained at this time, and store it.

The configuration of the third embodiment is the same as that of the first embodiment shown in FIG. 1 and FIG. 2 and detailed explanation will be omitted. Note that, while the memory for recording the moving image in the temporary recording section 5a records the image data before the still image shooting in the first embodiment, the present embodiment does not perform the temporary recording and thus the temporary recording section 5a can be omitted.

Figure 11:
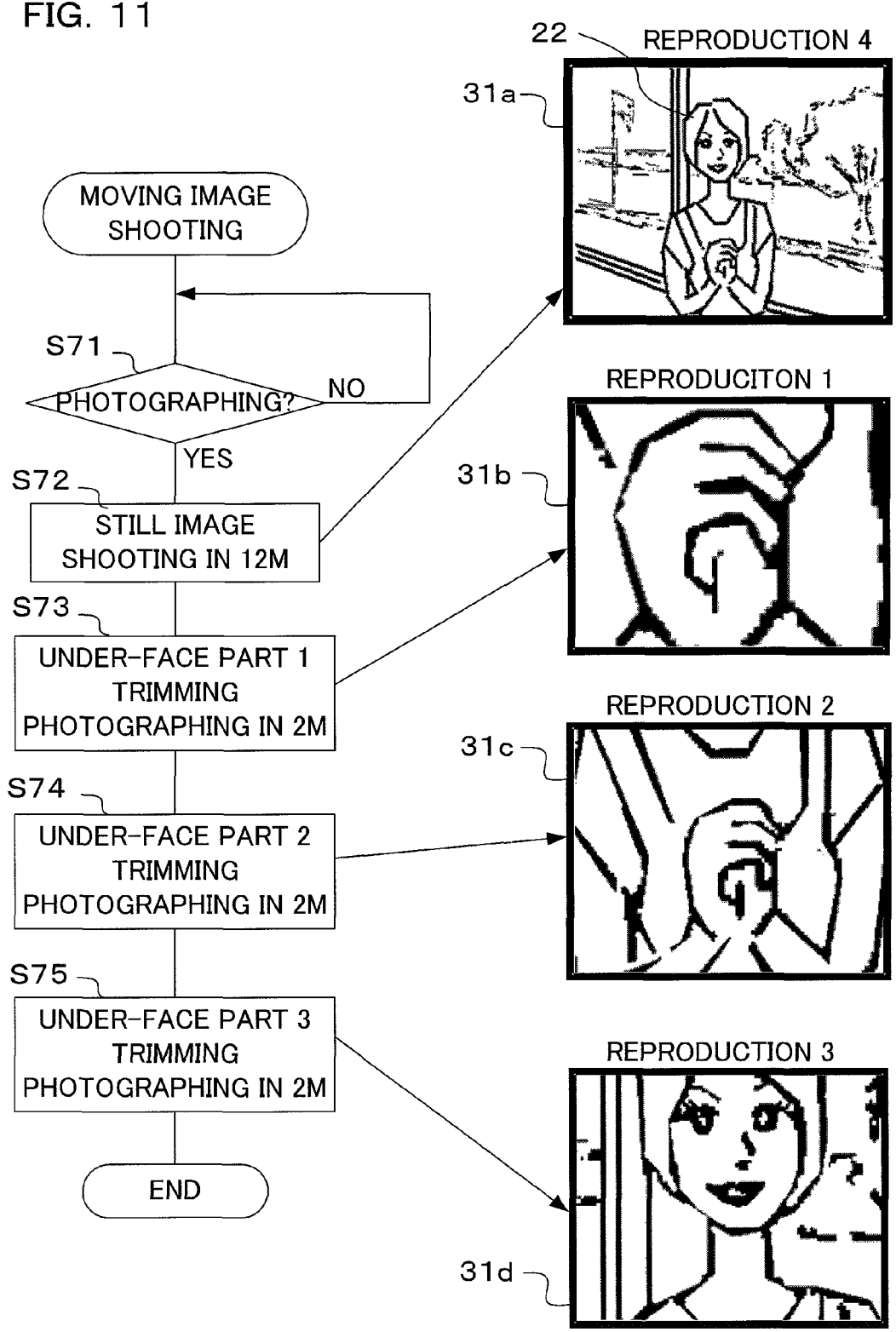
FIG. 11 is a diagram showing a procedure of still image shooting and moving image shooting which is performed contiguously after this still image shooting, in a camera according to a third embodiment of the present invention.

The photographing and the reproduction of the image in the present embodiment will be explained by the use of FIG. 11. Images 31a to 31d are shot in this order in the photographing, and the image 31a is a still image among them and the images 31b to 31d are a moving image (continuous shooting) shot after the still image shooting.

Also in the present embodiment, the still image 31a capturing a whole object 22 including its face is not reproduced and displayed from the start but a part except the face is displayed first and the whole image is made to appear gradually. That is, the trimming image 31b enlarging a hand part is displayed first, subsequently the trimming image 31c of a wider range including the hand part is displayed, then the trimming image 31d enlarging the face part is displayed, and lastly the still image 31a capturing the whole object 22 is displayed. Also in the present embodiment, it is possible to perform effective reproduction-display by utilizing viewer's expectation to know what (who) is photographed as soon as possible.

Next, the photographing operation of the camera 10 in the present embodiment will be described by the use of a flowchart shown in FIG. 11. When a moving image shooting flow starts, first, as in Step S1, it is determined whether the photographing is to be performed or not (S71). Since, when the moving image shooting flow starts, a live-view image is displayed by the use of the output of the imaging section 2 and a photographer determines composition and operates the release button when shooting the still image, it is determined here whether the release button has been operated or not.

When the photographing is not to be performed in the determination result of Step S71, the camera 10 enters a waiting state and waits for the operation of the release button in a state of displaying the live-view image. On the other hand, when the photographing is to be performed in the determination result of Step S71, the still image shooting is carried out (S72). Here, the image data of a still image output from the imaging section 2 is recorded in the recording section 6 in full image data (12M (12 million pixels)). This image corresponds to the still image 31a described above.

After the still image shooting, the trimming photographing is performed for an under-face part 1 (S73). Here, the trimming section 1b cuts out a part under the face part of the object 22, a hand part in this example, by the trimming of the full image data in 2M (2 million pixels), and image data corresponding to the image 31b is recorded finally in the recording section 6. Note that the number of pixels is determined to be 2M because this is the number of pixels when the reproduction-display in the high vision image is assumed as in the case of the first embodiment and may be determined to be another value according to an assumed reproduction-display apparatus.

Subsequently, the trimming photographing is performed for an under-face part 2 (S74). Here, a range which is located on the upper side of the under-face part 1 and also has a wider area than the under part 1, a part which includes the hand part and wider than the under part 1 in this example, is cut out by the trimming of the full-size image data in 2M and image data corresponding to the image 31c is recorded finally in the recording section 6.

After the photographing of this underpart 2, the trimming photographing is performed for an under-face part 3. Here, a range which is located on the upper side of the under-face part 2 and also has approximately the same area as the under part 2, an enlarged part including the face part in this example, is cut out by the trimming of the full-size image data in 2M and image data corresponding to the image 31d is recorded finally in the recording section 6. After this recording has been completed, this flow is terminated.

While the third embodiment performs the trimming processing to cut out the parts (under parts 1 to 3) from the full-size image data in Steps S73 to S75, respectively, in this manner, the continuity of the images is to be taken into careful consideration also here. Accordingly, preferably the trimming image is changed in a direction in which the face size becomes smaller and the trimming position is moved in a constant direction. While the trimming image is finally recorded in Steps S73 to S75 in the above explanation, respectively, the trimming image may be once recorded in the temporary recording section 5a and finally recorded in the recording section 6 in a lump.

Figure 12:
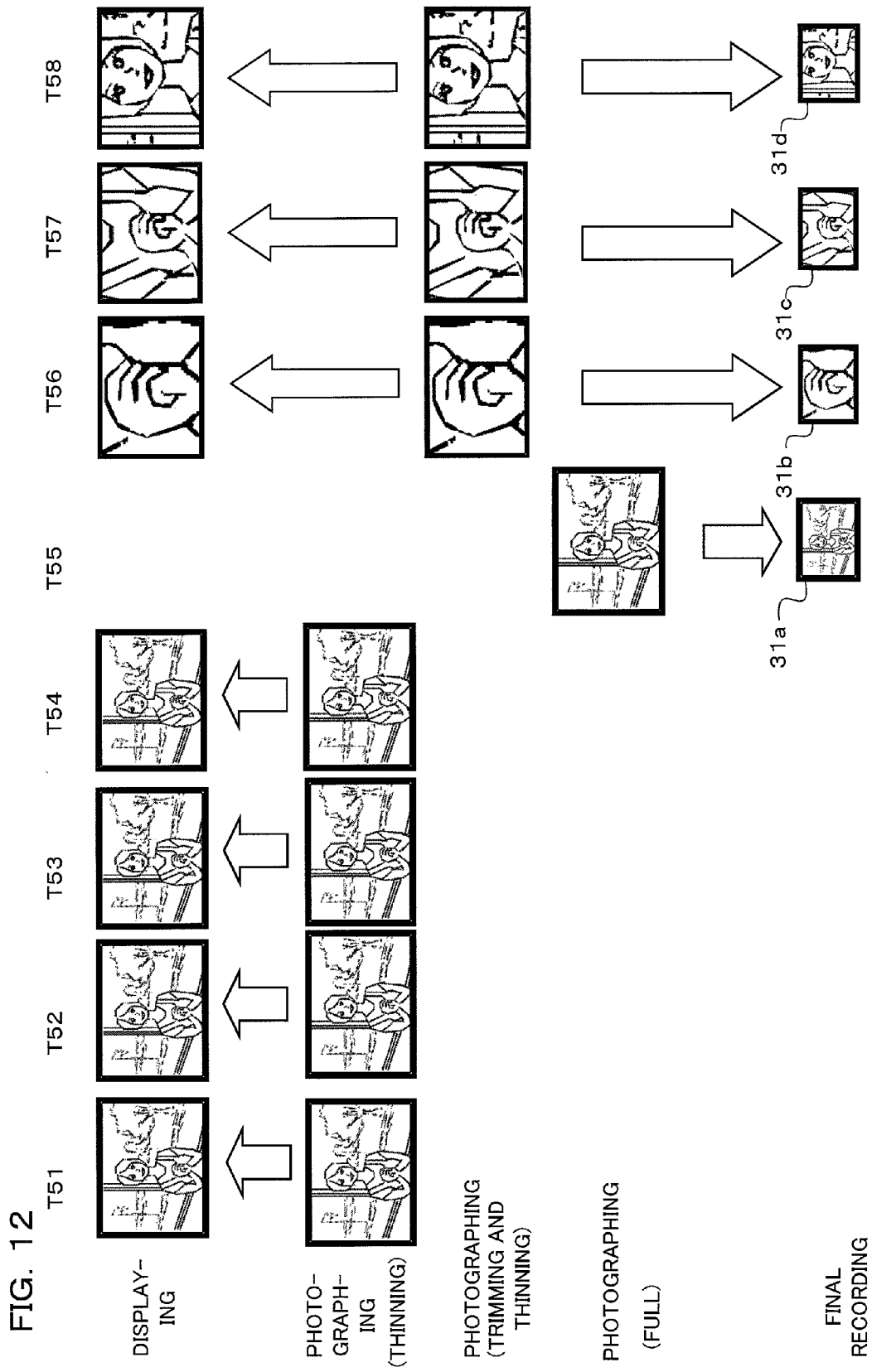
FIG. 12 is a diagram showing a relationship among still image shooting, a display in moving image shooting which is performed contiguously after this still image shooting, and an image to be recorded, in a camera according to a third embodiment of the present invention.

FIG. 12 shows a display and recording method for the image data of the moving image shooting and the still image shooting. Time T55 is the timing of the still image shooting, each of time T51 to T54 before that is the timing before the still image shooting, and each of time T56 to T58 is the timing of the trimming processing after the still image shooting. At the time T51 to T54, the image data output from the imaging section 2 is used only for the live-view display on the display section 8. At these time points, the image data from the imaging section 2 is just sent to the display section 8 after the thinning processing and the image data is not finally recorded as in the first and second embodiments.

At the time T55, the full-size image data of the still image is recorded finally in the recording section 6. Next, at the time T56 to T58, trimming ranges are cut out from the image data of the full-size moving image and the image data of this trimming image is recorded finally in the recording section 6. Further, the trimming image is displayed on the display section 8 using the image data generated at this time.

In this manner, the third embodiment generates the image data of the trimming images 31b, 31c and 31d sequentially from the moving image and records the image data finally in the recording section 6, after the shooting of the still image 31a. Then, in the reproduction-display, the present embodiment reproduces the trimming images 31b, 31c and 31d, and the still image 31a, in this order. Accordingly, it is not necessary to always perform the temporary recording of the moving image before the still image shooting, which simplifies the configuration. Note that, since the trimming images are generated in the order from a position far from the face and this order is in a time-sequence direction, uncomfortable feeling is not so much created in the reproduction. However, obviously the trimming image may be generated from a position close to the face.

The present embodiment performs the moving image shooting continuously after the still image shooting. Hence, unless the camera 10 is not directed to the object for a predetermined time (approximately 0.5 seconds to 2 seconds in the embodiment) also after the still image shooting, the image becomes uncomfortable in viewing. Accordingly, the present embodiment automatically extracts a person positioned in the center of the screen and records the face part of the person after the trimming so as not to put stress on the photographer more than necessary.

Figure 13:
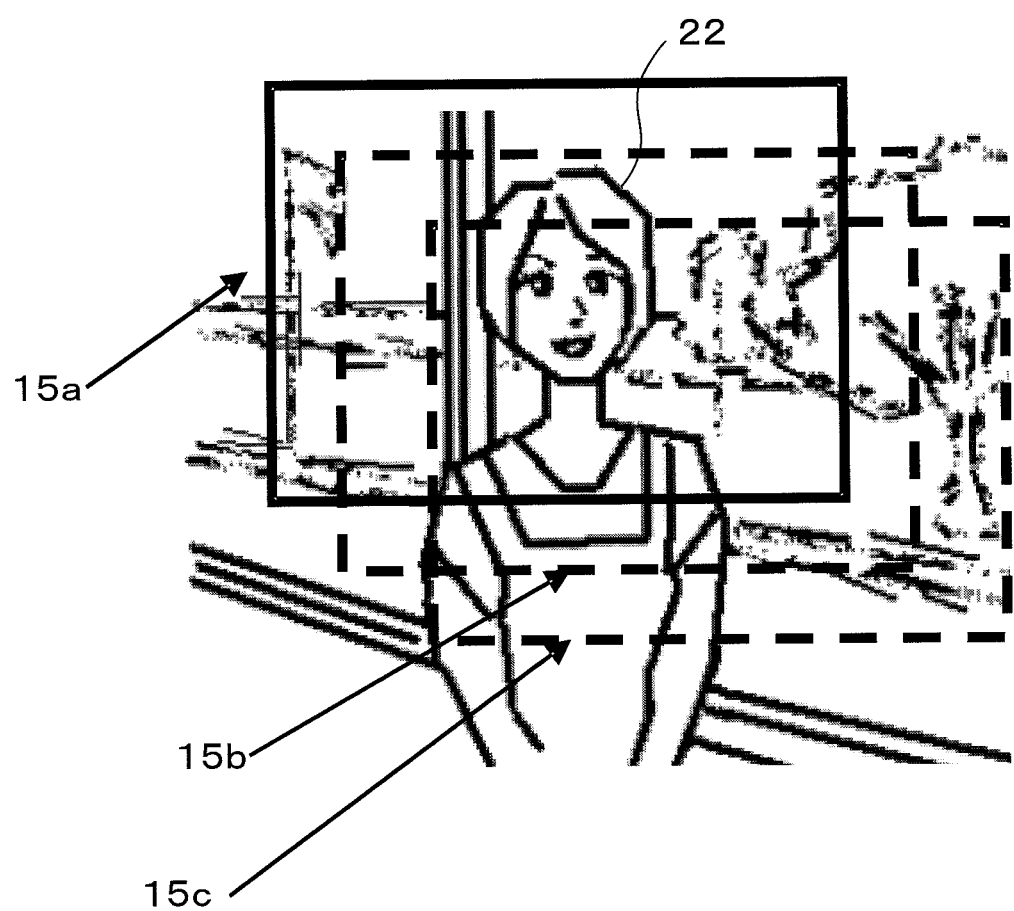
FIG. 13 is a diagram showing a state of changing a camera direction after still image shooting, in a camera according to a third embodiment of the present invention.

This trimming method will be explained by the use of FIG. 13 and FIGS. 14A to 14F. FIG. 13 shows a state of photographing the object 22, and the still image is shot in a photographing area 15a and the succeeding moving image is shot in photographing areas 15b and 15c. At this time, FIG. 14A is an image corresponding to the photographing area 15a, FIG. 14B is an image corresponding to the photographing area 15b, and FIG. 14C is an image corresponding to the photographing area 15c, among images shot by the camera 10.

Figure 14A:
FIGS. 14A to 14F are diagrams showing a state of recording and displaying a screen center part as a moving image even when a camera direction is changed after still image shooting, in a camera according to a third embodiment of the present invention.
Figure 14D:
Figure 14B:
Figure 14E:
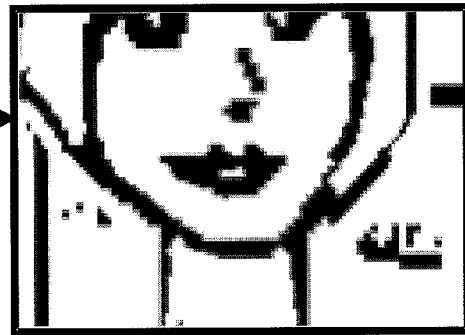
Figure 14C:
Figure 14F:
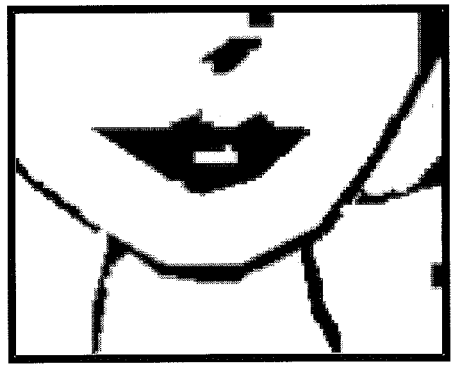

The image of FIG. 14A corresponding to the photographing area 15a of the still image is recorded as it is as shown in FIG. 14D, but, for the image corresponding to the photographing area 15b of the moving image, a trimming area 17b including the screen center of the photographing area 15a (face of the person 22 exists in the center) is recorded as shown in FIG. 14E, and for the image corresponding to the photographing area 15c of the moving image, a trimming area 17c including the screen center of the photographing area 15a is recorded as shown in FIG. 14F. Here, while the aspect ratio of the trimming area 17b or 17c may be changed from the aspect ratio of the still image, the aspect ratio is made the same in the present embodiment because the same aspect ratio can avoid uncomfortable feeling.

Note that the trimming processing explained by the use of FIG. 13 and FIGS. 14A to 14F is carried out by the composition change determination section 1a and the trimming section 1b within the control section 1. That is, when the composition change determination section 1a determines that the composition has been changed into the photographing areas 15a to 15c, the trimming section 1b performs the trimming processing according to the determination result. Further, while explained to be performed after the photographing, this trimming processing also can be performed before the photographing. That is, it is optional to perform the moving image shooting before the photographing and to cut out the parts corresponding to the photographing areas 17b and 17c by the trimming of the image data of the latest moving image after the still image shooting.

As explained above, the third embodiment of the present invention is configured to obtain the image data in the moving image (continuous shooting) after the still image shooting, to perform the trimming of this image data, and to record also the image data of the trimming image together with the image data of the still image. Accordingly, it is not necessary to temporarily record the image data of the moving image before the still image shooting, which makes it possible to simplify the configuration.

As explained above, each of the embodiments in the present invention obtains the image data from the imaging section 2 in response to the release operation and also obtains the image data of the continuous shooting from the imaging section 2 before or after the release operation, generates the trimming images sequentially in different areas for the respective frames using the image data of the continuous shooting, and records this generated trimming images and the image data at the release operation. Accordingly, anybody can shoot a colorful image with variety easily compared to the case of simple photographing.

Further, each of the embodiments in the present invention, before displaying an image of the whole screen, is configured to perform the trimming for a part of the image shot before or after the shooting of the image and display this trimming image in advance. Accordingly, it is possible to view a colorful image with variety. In particular, when a part such as a hand of a person is displayed first, subsequently the part of the person is moved gradually, and lastly the whole image is displayed after the enlarged display of the face, what (who) is photographed is imagined providing an effect as heightening expectation. Meanwhile, in the conventional photo viewing, when a person is photographed, a viewer is satisfied only in viewing the person. That is, the viewer carefully views a photograph capturing an interesting person and frequently skips a photograph capturing uninteresting person or a person without a good expression. It is regrettable that even a picture capturing an interesting thing around except a human face does not get interest and is skipped. Each of the embodiments in the present invention enlarges and displays a part except the face and helps when such an image is viewed with interest.

Here, each of the embodiments in the present invention shoots a still image in the photographing performed by the release button operation. However, not limited to this case, the shooting of a moving image may be started in response to the release button operation. While the third embodiment performs the shooting of the moving image (continuous shooting) after the still image shooting, the shooting of the moving image (continuous shooting) for the trimming may be performed in response to the release button operation after the moving image shooting is terminated.

Further, each of the embodiments in the present invention performs the trimming for a part related to a person of an object and moves the trimming position linearly toward a face position, not limited to this case, the processing may be performed such that the trimming image is moved along the body profile of the person toward the face. In addition, while the initial position is to be a part related to the person, the initial position may be a characteristic part except the part related to the person and the trimming range may be changed from this characteristic part to the person. The characteristic part may be a thing which exists around the image and has a feature in its shape in comparison with the preceding and succeeding images, such as a colored thing like a flower bouquet and a brilliant thing like as an accessory. Moreover, while each of the embodiments generates the trimming images sequentially as in an order from an enlarged image to a shrunk image, not limited to this case, the trimming images may be generated such that an enlarged image shrinks.

Further, when the face appears first, viewer's interest, such as what expression appears and who is photographed, is lost. Accordingly, attention is made to be directed from a thing which hardly catches an eye even though captured in the screen, gradually to the person. For example, even for the case except the under-face part, a stage of the photographing may be displayed first by displaying a background and then processing may be performed so as to direct the image toward the face while heightening expectation to know who went there. When the same expression continues and the image becomes monotonous, the trimming start position is changed from a part related to the person to such a characteristic thing. Even in the same image, the viewer is guided by a lot of information and imagination is stirred Further, while each of the embodiments in the present invention explains the equipment for photographing by the use of a digital camera, the camera may be a single reflex digital camera or a compact digital camera and may be a moving image camera such as a video camera and a movie camera, and further may be a camera incorporated in a mobile phone, a mobile information terminal (PDA: Personal Digital Assistant), a game console, or the like The present invention is not limited to the above embodiment as it is and can be realized by modifying the components in a range without departing from the spirit thereof in the step of implementation. In addition, various inventions can be formed by optionally combining a plurality of components disclosed in the above embodiment. For example, some components may be omitted from all the components shown in the embodiment. Further, the components may be arbitrarily combined across the different embodiments.

What is claimed is:

1. A photographing apparatus, comprising:
   an imaging section converting an object image into image data;
   a photographing section obtaining the image data from the imaging section in response to release operation;
   a trimming section generating trimming images sequentially for frames in different areas, respectively, using the image data;
   a control section recording the trimming image generated in the trimming section and the image data obtained in the release operation; and
   a face detection section detecting a face part from the object image, wherein
   the trimming section sequentially generates the trimming images to be generated in the different areas so that the trimming image comes close to the detected face part from a position far from the face part.

2. The photographing apparatus according to claim 1, wherein
   the trimming section sequentially generates the trimming images so as to switch a size of a trimming range in generating the trimming image.

3. The photographing apparatus according to claim 1, wherein
   the photographing section obtains the image data of the continuous shooting before the release operation, and
   the trimming section generates the trimming image using this obtained image data of the continuous shooting and temporarily records the trimming image.

4. The photographing apparatus according to claim 1, wherein
   the photographing section obtains the image data of the continuous shooting before the release operation and also temporarily records this obtained image data, and
   the trimming section generates the trimming image using the temporarily recorded image data of the continuous shooting and records the trimming image finally after the release operation.

5. The photographing apparatus according to claim 1, wherein
   the photographing section obtains the image data of the continuous shooting after the release operation, and
   the trimming section generates and records the trimming image using this obtained image data of the continuous shooting.

6. The photographing apparatus according to claim 1, further comprising
   a display section displaying the image obtained in the release operation and the trimming image.

7. The photographing apparatus according to claim 1, wherein the photographing section also obtains the image data of continuous shooting from the imaging section before or after the release operation, whereby the image data also includes image data of the continuous shooting.

8. A photographing apparatus, comprising:
   an imaging section converting an object image into image data;
   a photographing section obtaining the image data from the imaging section in response to release operation;
   a trimming section generating trimming images sequentially for frames in different areas, respectively, using the image data;
   a control section recording the trimming image generated in the trimming section and the image data obtained in the release operation; and
   a face detection section detecting a face part from the object image and detecting face expression of this detected face, wherein
   the control section determines a time available for displaying the generated trimming image according to a change time of the face expression detected by the face detection section.

9. The photographing apparatus according to claim 8, wherein
   the trimming section sequentially generates the trimming images so as to switch a size of a trimming range in generating the trimming image.

10. The photographing apparatus according to claim 8, wherein
    the photographing section obtains the image data of the continuous shooting before the release operation, and
    the trimming section generates the trimming image using this obtained image data of the continuous shooting and temporarily records the trimming image.

11. The photographing apparatus according to claim 8, wherein
    the photographing section obtains the image data of the continuous shooting before the release operation and also temporarily records this obtained image data, and
    the trimming section generates the trimming image using the temporarily recorded image data of the continuous shooting and records the trimming image finally after the release operation.

12. The photographing apparatus according to claim 8, wherein
the photographing section obtains the image data of the continuous shooting after the release operation, and
the trimming section generates and records the trimming image using this obtained image data of the continuous shooting.

13. The photographing apparatus according to claim 8, further comprising
a display section displaying the image obtained in the release operation and the trimming image.

14. The photographing apparatus according to claim 8, wherein the photographing section also obtains the image data of continuous shooting from the imaging section before or after the release operation whereby the image data also includes image data of the continuous shooting.

15. A photographing apparatus, comprising:
an imaging section converting an object image into image data;
a photographing section obtaining the image data from the imaging section in response to release operation and also obtaining the image data of continuous shooting from the imaging section before or after the release operation;
a trimming section generating trimming images sequentially for frames in different areas, respectively, using the image data of the continuous shooting;
a control section recording the trimming image generated in the trimming section and the image data obtained in the release operation; and
a face detection section detecting a face part from the object image and detecting face expression of this detected face, wherein
the control section determines a trimming start position of the trimming image and moving speed of the trimming image according to a change time of the face expression detected by the face detection section.

16. The photographing apparatus according to claim 15, wherein
the trimming section sequentially generates the trimming images so as to switch a size of a trimming range in generating the trimming image.

17. The photographing apparatus according to claim 15, wherein
the photographing section obtains the image data of the continuous shooting before the release operation, and
the trimming section generates the trimming image using this obtained image data of the continuous shooting and temporarily records the trimming image.

18. The photographing apparatus according to claim 15, wherein
the photographing section obtains the image data of the continuous shooting before the release operation and also temporarily records this obtained image data, and
the trimming section generates the trimming image using the temporarily recorded image data of the continuous shooting and records the trimming image finally after the release operation.

19. The photographing apparatus according to claim 15, wherein
the photographing section obtains the image data of the continuous shooting after the release operation, and
the trimming section generates and records the trimming image using this obtained image data of the continuous shooting.

20. The photographing apparatus according to claim 15, further comprising
a display section displaying the image obtained in the release operation and the trimming image.

* * * * *